US012703427B2

(12) United States Patent
Matecki et al.

(10) Patent No.: US 12,703,427 B2
(45) Date of Patent: Aug. 11, 2026

(54) VEHICLE FRONT RAIL

(71) Applicant: Shape Corp., Grand Haven, MI (US)

(72) Inventors: Joseph Matecki, Allendale, MI (US); Jeffrey McHenry, Norton Shores, MI (US); Endry Gardian, Taufkirchen (DE); Matthew Kuipers, Holland, MI (US); Zehua Qin, Norton Shores, MI (US)

(73) Assignee: Shape Corp., Grand Haven, MI (US)

( * ) Notice: Subject to any disclaimer, the term of this patent is extended or adjusted under 35 U.S.C. 154(b) by 315 days.

(21) Appl. No.: 18/461,363

(22) Filed: Sep. 5, 2023

(65) Prior Publication Data

US 2024/0075987 A1 Mar. 7, 2024

Related U.S. Application Data

(60) Provisional application No. 63/374,402, filed on Sep. 2, 2022.

(51) Int. Cl.
*B62D 21/15* (2006.01)
*B62D 21/02* (2006.01)
(Continued)

(52) U.S. Cl.
CPC ........... *B62D 21/152* (2013.01); *B62D 21/02* (2013.01); *B62D 25/085* (2013.01); *B62D 29/00* (2013.01)

(58) Field of Classification Search
CPC ... B21C 37/0803; B21C 37/151; B62D 21/02; B62D 21/152; B62D 25/08; B62D 25/085; B62D 29/00; B62D 29/007
See application file for complete search history.

(56) References Cited

U.S. PATENT DOCUMENTS 4,057,263 A 11/1977 Schwuchow et al.
6,695,393 B1 2/2004 Aouadi et al.
(Continued)

FOREIGN PATENT DOCUMENTS

DE 69508544 T2 9/1999
DE 10214051 A1 10/2003
(Continued)

OTHER PUBLICATIONS

International Search Report & Written Opinion for Application No. PCT/US2025/011849; mailed Apr. 23, 2025; 13 pp.
(Continued)

*Primary Examiner* — Lori Lyjak
(74) *Attorney, Agent, or Firm* — Bodman PLC

(57) ABSTRACT

A front rail configured to be supported by a vehicle frame includes a tubular body formed by a roll-formed high-strength metal and configured to undergo axial loading during a front vehicle impact. The high-strength metal sheet defines a cross-sectional shape along a length of the tubular body. The tubular body includes a central wall extending from a first side wall to a second side wall defining at least a first longitudinal channel and a second longitudinal channel. A groove is disposed in first side wall of the tubular body and extends longitudinally along at least a portion of the length of the tubular body to stiffen the tubular body. A hole extends through the first side wall of the tubular body proximate the groove and is configured as a bend initiator.

20 Claims, 27 Drawing Sheets

(51) Int. Cl.

| | |
|---|---|
| ***B62D 25/08*** | (2006.01) |
| ***B62D 29/00*** | (2006.01) |

(56) References Cited

U.S. PATENT DOCUMENTS

| | | | |
|---|---|---|---|
| 7,197,824 | B1 | 4/2007 | Graber |
| 7,617,916 | B2 | 11/2009 | Heatherington et al. |
| 9,956,991 | B1 | 5/2018 | Nishikawa et al. |
| 10,336,371 | B2 * | 7/2019 | Sawa ...................... B60R 19/34 |
| 11,465,693 | B2 | 10/2022 | Aitoh |
| 2005/0151394 | A1 | 7/2005 | Gruneklee et al. |
| 2006/0237976 | A1 | 10/2006 | Glasgow et al. |
| 2014/0008924 | A1 | 1/2014 | Han et al. |
| 2014/0033791 | A1 | 2/2014 | Johnson et al. |
| 2014/0084634 | A1 | 3/2014 | Suzuki et al. |
| 2017/0274851 | A1 | 9/2017 | Schneider et al. |
| 2018/0334191 | A1 | 11/2018 | Legray et al. |
| 2021/0261075 | A1 | 8/2021 | Pendergrass |
| 2024/0075987 | A1 | 3/2024 | Matecki et al. |
| 2025/0083631 | A1 | 3/2025 | Matecki et al. |

FOREIGN PATENT DOCUMENTS

| | | | |
|---|---|---|---|
| EP | 1384536 | B1 | 10/2008 |
| EP | 3208487 | A1 | 8/2017 |
| EP | 3173293 | B1 | 12/2018 |
| EP | 4116175 | A1 | 1/2023 |
| JP | 3039145 | B2 | 5/2000 |
| JP | 2003285766 | A | 10/2003 |
| WO | 2014088117 | A1 | 6/2014 |
| WO | 2016060255 | A1 | 4/2016 |
| WO | 2017097426 | A1 | 6/2017 |
| WO | 2018184313 | A1 | 10/2018 |
| WO | 2020017645 | A1 | 1/2020 |
| WO | 2021168424 | A1 | 8/2021 |

OTHER PUBLICATIONS

International Search Report for Application No. PCT/US2023/073483; mailed Nov. 17, 2023; 7 pp.

Office Action for JP Patent Application No. 2025-512671, mailed on Feb. 24, 2026, 22 pp.

* cited by examiner 20
34
30
$B_1$
32
36
38
40

20
34
32
$B_3$
$B_2$
30
36
38
42

20
34
VIII
IX
30
$B_2$
$B_3$
32
XI
VIII
$B_1$
IX
38
44
XI 20
34
32
30
38
46

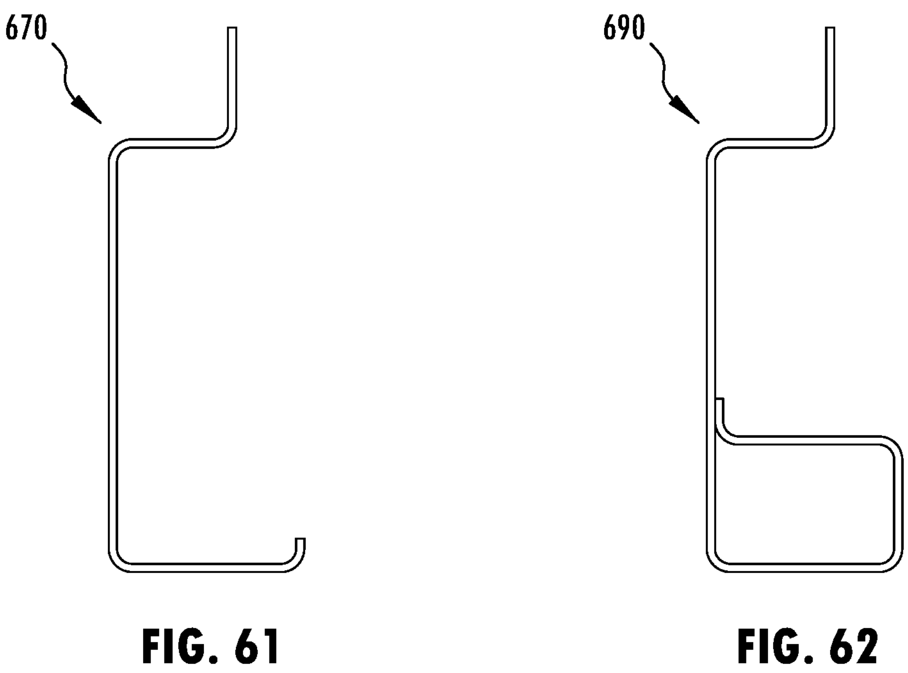
FIG. 61
FIG. 62
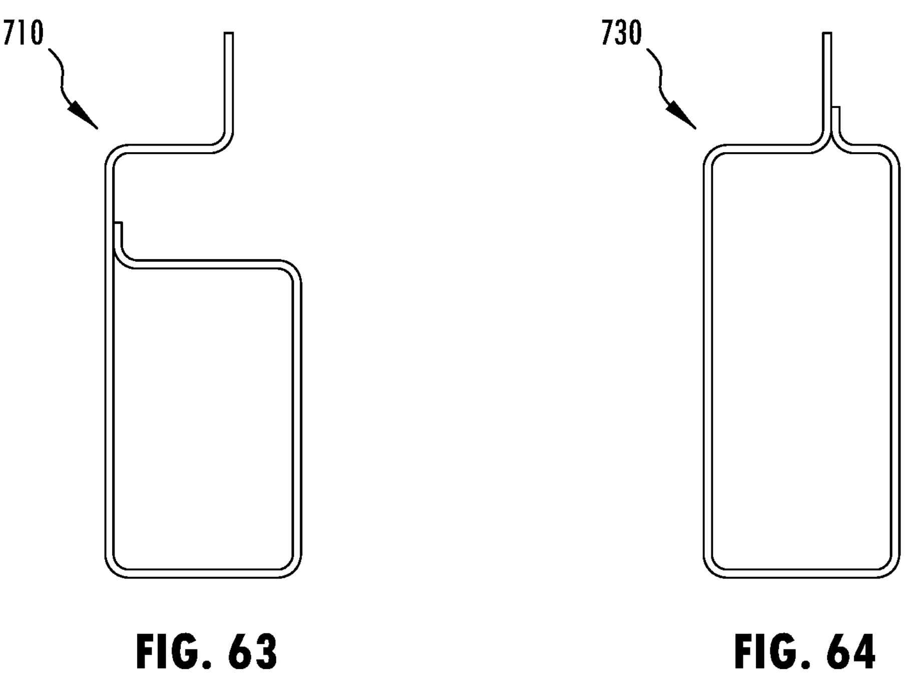
FIG. 63
FIG. 64

VEHICLE FRONT RAIL

CROSS-REFERENCE TO RELATED APPLICATION

This application claims benefit and priority under 35 U.S.C § 119(e) to U.S. Provisional Patent Application No. 63/374,402, filed Sep. 2, 2022, the disclosure of which is considered part of this application and is hereby incorporated by reference in its entirety.

TECHNICAL FIELD

The present disclosure relates to vehicle frame assemblies and more specifically to front rail forms and assemblies for vehicle body structures.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Front impacts to a vehicle are commonly tested with front end impact testing, which direct significant impact forces to the front of the vehicle. Vehicle frames primarily absorb these front impacts via front rails and front rail assemblies that run longitudinally between the front bumper and vehicle cab.

It is desirable for the front impact forces to be converted into other forms of energy in a predictable and controllable manner. In order to achieve the goals of crashworthiness, light weight, and efficient material usage, improved forms for front rails are desirable. In a transition toward electric vehicles, the presence of the engine in the front portion of the vehicle is no longer a given in vehicle design. Therefore, front rails will be increasingly critical in absorbing front impact energy in a predictable and controlled manner, and opportunities exist to provide improved front rail and front rail assemblies.

SUMMARY

The present disclosure provides a vehicle front rail that absorbs front impact energy in a predictable and controlled manner. The front rail may include a high-strength metal sheet or other rigid material extending longitudinally along a length to form a tubular beam, to direct longitudinal forces between a bumper assembly and a mid-frame component at opposing ends of the tubular beam. The tubular beam may have a constant cross sectional shape and area along its length. Alternatively, the tubular beam may have a substantially constant cross-sectional shape and area along its length, such as in instances of a tapered aspect or angular formation.

The front rail may be formed of a single continuous piece of material, such as a sheet material that is formed via roll forming, stamping, or a combination thereof. In some examples, the front rail may be formed of multiple pieces of material joined together. The front rail may be formed of a plurality of pieces of a single material or multiple materials, or may be formed of a first piece of a first material and a second piece of a second material. One or more edges of the sheet material may be welded or otherwise secured to form a closed cross section. The front rail may include at least one hollow channel extending longitudinally within the closed cross section, and in some examples may include two or more hollow channels extending longitudinally within the closed cross section.

The front rail may be formed to have a substantially rectangular cross-sectional shape. In additional examples, the front rail may be formed to have other cross-sectional shapes, such as a substantially rhomboidal cross-sectional shape. Further, in some examples, the front rail may include an external flange extending outwardly from the cross-sectional shape. The front rail may include one or more grooves or channels protruding inwardly of the substantially rectangular cross-sectional shape on one or more of the walls. The cross-sectional aspect of the groove or channel may be square, trapezoidal, rounded, or other suitable shape. The cross-sectional shape of the front rail may be configured to undergo axial loading in a frontal vehicle impact.

The front rail may include one or more bend initiators. The bend initiator may include one or more holes or angular bends extending transversely and disposed somewhere longitudinally along the length of the front rail. The bend initiator may be imposed on one or more side of the front rail cross section. The bend initiator may be imposed equally among a pair of sides of the front rail cross section. The bend initiator may be imposed unequally among the sides of the front rail cross section. For example, the bend initiator may form a vertically aligned set of holes.

The front rail may be a structural component for a vehicle frame and include a tubular beam of a metal sheet roll-formed along its length to define an enclosed cross-sectional shape that extends a length of the tubular beam with a front end configured to couple to a bumper assembly and a rear end opposite the front end configured to couple to a mid-frame component. The enclosed cross-sectional shape is configured to undergo axial loading in a frontal vehicle impact between the front and rear ends such that during axial loading impact energy is absorbed and transformed in a controlled and predictable manner by deformation of the cross-section shape along the length of the tubular beam.

The cross-sectional shape may define an enclosed shape comprising a hollow channel extending longitudinally the length of the tubular beam or an enclosed shape comprising a plurality of separated hollow channels extending the length of the tubular beam. The plurality of hollow channels may be separated by a common wall formed from the high-strength metal sheet. A groove may protrude inward of the cross-sectional shape and extend longitudinally in a groove direction, wherein the groove direction is substantially parallel to the length of the tubular beam. A hole extending through the metal sheet may be positioned proximate the first end of the tubular beam. The tubular beam may be formed from roll-forming the metal sheet. A first edge and a second edge of the metal sheet may be secured at a first joint location and a second joint location in the cross-sectional shape.

The disclosure provides for a structural beam for a vehicle and includes an elongated body formed from a metal sheet material. The metal sheet material may be a high-strength steel. The body may extend from a first end at a bumper assembly to a second end at a mid-frame assembly, and include a cross-sectional shape extending the length of the body. The cross-sectional shape may be further defined by a central wall of the metal sheet material and at least one channel formed in the elongated body.

The outer wall, such as the side wall portion, of the elongated body may include a plurality of grooves protruding inwardly of the cross-sectional shape and extending longitudinally along a portion of the length of the elongated body. The plurality of grooves may be located adjacent to at least one of the first end or the second end and be configured to locally stiffen the elongated body upon axial loading of the structural beam.

The elongated beam may include a plurality of apertures defining a channel extending through the outer wall and inner wall of the tubular body. The plurality of apertures may be located adjacent to the plurality of grooves and be configured to initiate a bending of the elongated body upon axial loading of the beam.

The structural beam may include a first recessed area and a second recessed area in the elongated body. The metal sheet material may include a first edge portion that is positioned in the first recessed area and a second edge portion that is positioned in the second recessed area. A first weld joint may be formed between the first edge portion and the outer wall of the elongated body in the first recessed area. A second weld joint may be formed between the second edge portion and the outer wall of the elongated body in the second recessed area. The outer walls the elongated body may be disposed in generally planar alignment.

The central wall may be configured in a stepped shape having a first horizontal portion, a second horizontal portion, and a vertical portion therebetween. A plurality of fasteners may be attached to the elongated body and disposed on the inner wall of the elongated body. At least a pair of the fasteners may be laterally aligned with the vertical portion of the central wall.

The front rail may be configured to be supported by a vehicle frame and include a tubular body formed by a roll-formed high-strength metal sheet and defining a cross-sectional shape. The tubular body may include a central wall extending from a first internal wall to a second internal wall to form at least a first longitudinal channel and a second longitudinal channel extending the length of the tubular body. An outer wall of the tubular body may include a groove extending longitudinally in the length of the tubular body and a hole may extend through the surface of the tubular body proximate the groove. The tubular body may be configured to undergo axial loading during a frontal vehicle impact. Under said axial loading, the tubular body may be configured to bend at the hole.

Implementations of the disclosure may include one or more of the preceding features in various combinations.

BRIEF DESCRIPTION OF THE DRAWINGS

FIGS. 50-64 illustrate alternative cross sections that may be practiced with the exemplary front rails of the present disclosure.

Figures 1, 2:
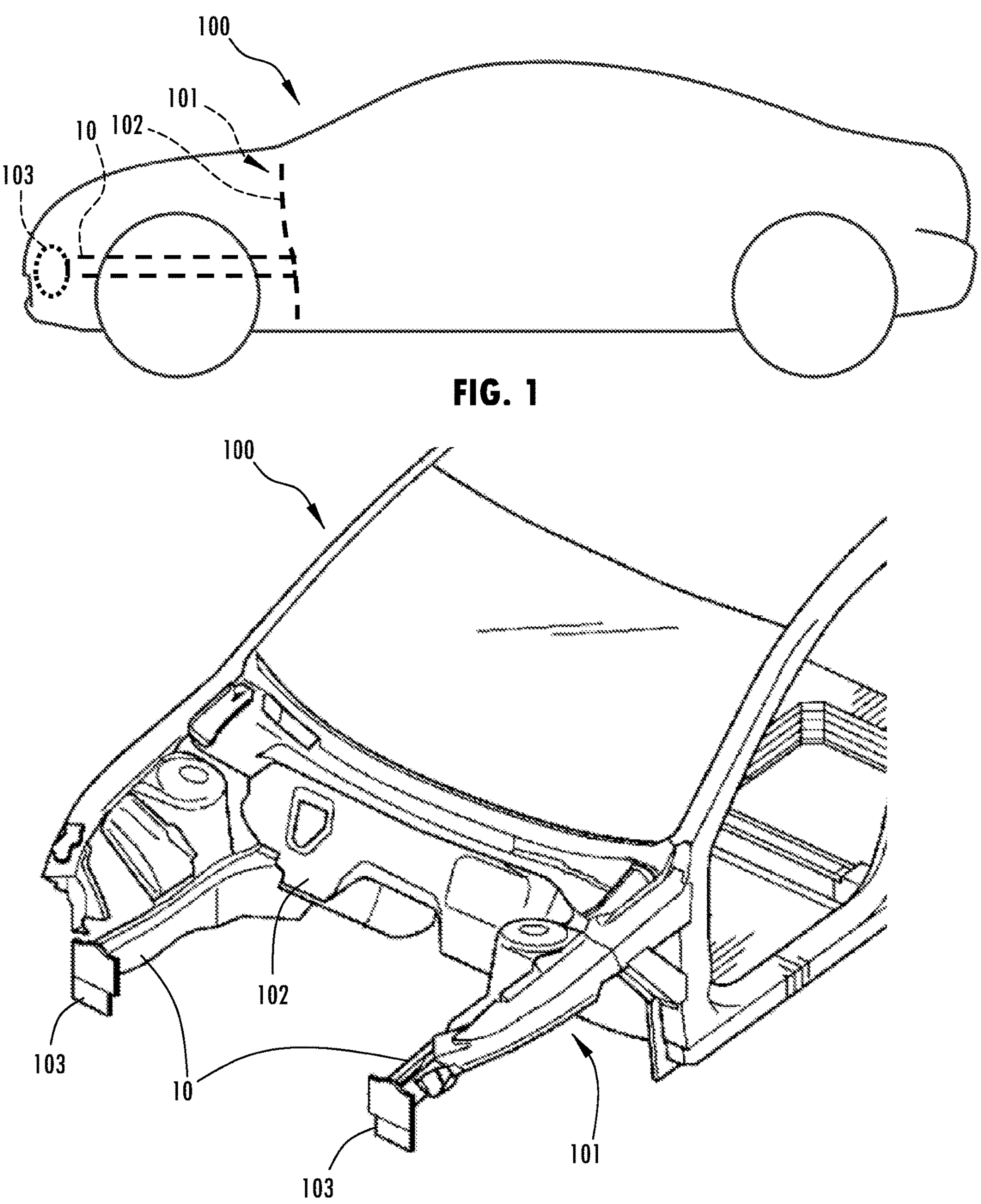
FIG. 1 is a side elevation view of a vehicle showing a front rail extending between a bumper assembly and a vehicle frame component proximate a passenger cabin.
FIG. 2 is a partial perspective view of a partial vehicle frame including a pair of front rails extending between attachment plates of a vehicle bumper assembly and a vehicle frame component proximate a passenger cabin.

The details of one or more examples of the disclosure are set forth in the accompanying drawings and the description below. Other aspects, advantages, purposes, and features will be apparent upon review of the following specification in conjunction with the drawings, where like reference numerals indicate like parts.

DETAILED DESCRIPTION

Structural frames and assemblies for vehicle structures, such as a vehicle front rail, are disclosed herein in various implementations as impact energy absorption and management devices that are used in conjunction with other vehicle components to absorb and manage impact loads and energy so as to minimize damage and intrusion during an impact to the vehicle. For example, a structural beam may be employed between a bumper assembly and a mid-frame assembly. In some instances, vehicle assemblies can have increased front end stiffness and impact energy absorption requirements, such as on electric vehicles or rear engine mounted vehicles with greater vehicle mass and front ends that may be more susceptible to impact intrusion. While it is generally known that front rail beams with increased mass can function to meet increased stiffness requirements, increasing mass typically adds to the vehicle cost while also reducing efficiency. Structural beams disclosed herein may provide increased stiffness being formed, for example by roll-forming, of a single sheet of metal or other rigid material with crashworthy mechanisms for converting impact forces into other forms of energy in predictable and controlled manners.

Referring now to the drawings and the illustrative embodiments depicted therein, a front rail 10 is provided for a vehicle 100, such as for a body structure or frame 101, such as illustrated in FIGS. 1 and 2. The vehicle frame 101 and associated components may have various designs and configurations, such as for different styles and types of vehicles. As shown in FIGS. 1 and 2, the vehicle frame 101 may include a mid-frame assembly or firewall 102 and a bumper assembly 103, among other vehicle frame components. The front rail 10 may be used as a structural frame component designed to undergo various impact forces and designed to support and sustain different loading conditions. While designing the vehicle to meet the required impact and loading requirements, the dimensions of the front rail 10 component may be reduced and the overall weight of the front rail 10 may be reduced by providing a front rail 10 of the present disclosure. The vehicle 100 may include a pair of front rails 10 bracketing a front engine compartment. The vehicle 100 may not include a propulsion system having an internal combustion engine, and so the front engine compartment may be a front storage compartment. The front rail 10 may extend at least a portion of the distance between a front bumper assembly 103 and a firewall 102 or other structural component of the vehicle frame 101.

Figure 3A:
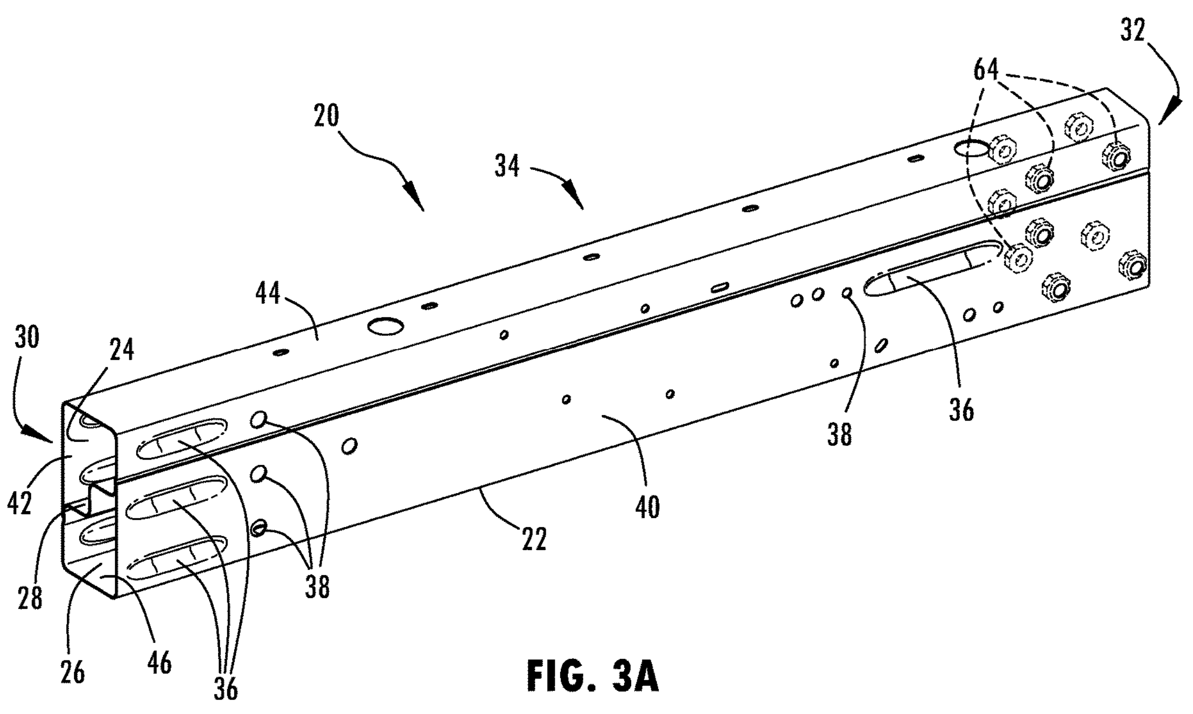
FIG. 3A is a front perspective side view of an exemplary front rail according to the present disclosure.
Figure 3B:
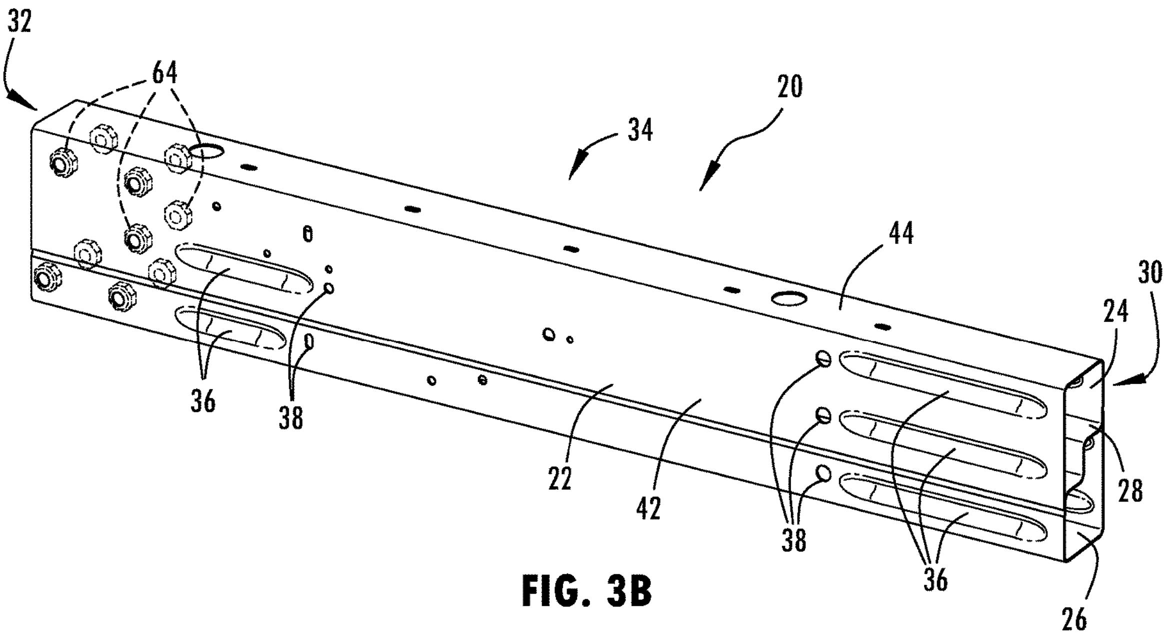
FIG. 3B is a rear perspective side view of the exemplary front rail according to the present disclosure.

Referring now to FIGS. 3A-3B, a first exemplary front rail 20 is shown. The front rail 20 is a roll-formed structural element formed of a single piece of a thin plate material 22. The rail 20 includes a closed cross-sectional shape. The rail 20 profile defines an elongated body or tubular beam 34 which may be defined by a first side wall portion 40, a second side wall portion 42, a top wall portion 44, and a bottom wall portion 46. The first side wall portion 40 may be located inboard relative to the second side wall portion 42, or reversed to be located outboard relative to the second side wall portion in additional examples of the rail. The first side wall portion 40 and first side wall portion 42 may be connected by the top wall portion 44 and the bottom wall portion 46. A front end 30 of the beam 34 is configured to couple with the bumper assembly 103 or other vehicle frame component. A rear end 32, opposite the first end 30, is configured to couple to a mid-frame component such as a firewall 102 or other vehicle frame component. The cross-sectional shape of the elongated body 34 extends along a length of the body 34 from the front end 30 to the rear end 32. The elongated body 34 may include a central wall 28 extending longitudinally along the length of the body 34 such that the cross-sectional shape includes a plurality of hollow channels defined by the central wall 28. For example, the closed cross-section may include two hollow channels 24, 26 divided by the central wall 28 that each extend longitudinally along the body 34. Alternatively, the cross-sectional shape may have more of less channels.

The metal sheet material 22 of the structural beam 34 may comprise any metals or metal alloys that have the desired characteristics, such as stiffness, tensile strength, and the like. For example, the material may include aluminum or steel, such as a high strength or ultra-high strength steel, as well as combinations of other related metals in different alloys. The sheet material may be entirely or partial a non-sheet material, such as an injection molded polymer, a composite, an aluminum extrusion, or a composite pultrusion, or the like. The sheet material of the outer beam profile 20 may be formed in various processes, such as with the use of cold stamping, roll forming, roll stamping, hot stamping, press brake bending, or combinations thereof. References herein to a particular forming process should be understood as non-limiting. Selection of the appropriate forming process for a particular material and application of the presently disclosed structural beam 34 may be understood as within the level of ordinary skill.

The enclosed shape of the elongated body 34 is configured to undergo axial loading in a frontal vehicle impact between the front and rear ends. As illustrated in FIGS. 3A-5, a plurality of grooves 36 and apertures 38 may be located on the first side wall portion 40 (FIG. 4) and second side wall portion 42 (FIG. 5) of the body 34 and are configured to act as stiffeners and bend initiators, respectively.

Figures 4, 5, 6, 7:
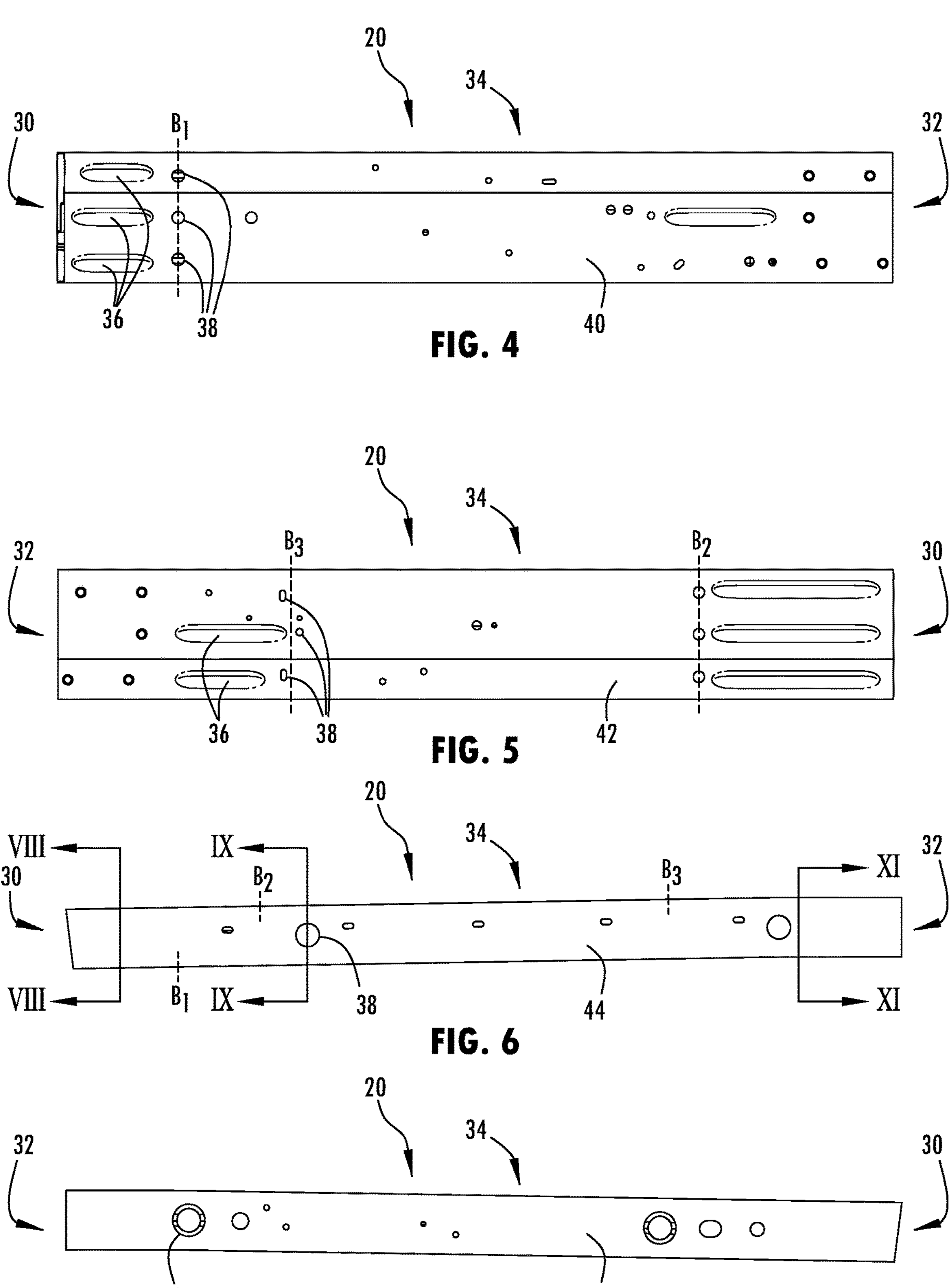
FIG. 4 is a side view of the exemplary front rail of FIG. 3A.
FIG. 5 is a side view of the exemplary front rail of FIG. 3B.
FIG. 6 is a top view of the exemplary front rail of FIG. 4.
FIG. 7 is bottom view of the exemplary front rail of FIG. 4.

The plurality of grooves 36 comprise a groove protruding inward of the cross-sectional shape and extending longitudinally in a groove direction. The groove direction is substantially parallel to the length of the elongated body 34. One or more of the grooves may extend along a partial section of the length of the elongated body, or in additional examples may extend along the entire or substantial entire length of the elongated body. The body 34 may include a groove located adjacent to at least one of the first end 30 or the second end 32. For example, the body 34 may include a single groove 36 or more than one groove 36. Proximate the first end 30, the body 34 may include one or more grooves 36 on the first side wall portion 40 (FIG. 4) and one or more grooves 36 on the second side wall portion 42 (FIG. 5). Proximate the second end 32, the body 34 may include one or more grooves 36 on the first side wall portion 40 (FIG. 4) and one or more grooves 36 on the second side wall portion 42 (FIG. 5).

The plurality of grooves 36 are shaped to selectively increase strength of the body 34 in an area as a stiffening channel that improves axial loading at the select area of the body 34. The grooves 36 may be a selective and localized strengthening of an otherwise flat section of the sheet material 22. The grooves 36 may be localized proximate the front end 30 disposed toward the bumper assembly 103 of the vehicle 100, with fewer or no grooves 36 proximate the rear end 32 disposed toward the firewall 102 or mid-frame assembly of the vehicle 100. During a frontal vehicle impact, impact forces are loaded axially to the front rail 20, such that the section of the beam with the grooves has an increased axial load capacity. The grooves 36 may be formed by stamping operations before or following the formation of the cross-sectional structure via roll-forming or may be formed in-line with the roll-forming operation.

Figure 9:
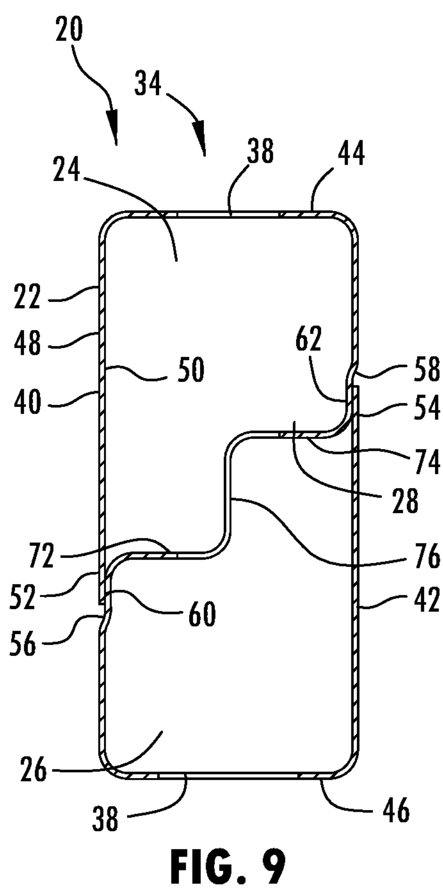
FIG. 9 is a transversal cross section of the exemplary front rail of FIG. 6 taken along line IX-IX.

The plurality of apertures 38 comprise a hole or void in the sheet material 22, extending from an outer wall or surface 48 of the sheet material 22 to the inner wall or surface 50 of the material 22 (FIG. 9). As shown in FIG. 3A, the apertures 38 may be located proximate the grooves 36 such that an aperture 38 is provided and corresponds to a groove 36. For example, the apertures 38 may be positioned approximate an end of a corresponding groove 36, such that upon axially loading the beam, the locally stiffened section of the beam forward the apertures 38 is resistant to failure or buckling before the failure at the apertures. The vertically aligned apertures 38 together form effective bend initiation lines $B_1$-$B_3$, such that axial forces cause failure at the bend initiation lines $B_1$-$B_3$ to result in a controlled bending failure of the beam that has a desired force deflection characteristic and a d desired location of bending the beam. As such, the bend initiation lines $B_1$-$B_3$ are located on the first side wall potion at different locations along the length of beam than the second side wall portion. Additional apertures 38 may be positioned along the body 34 at various locations that do not correspond to a groove 36 but otherwise are in areas that promote desired deformation characteristics of the beam, such as positioned on the first side wall portion 40 or second side wall portion 42. Alternatively, the apertures 38 may be positioned on the top wall portion 44 or bottom wall portion 46.

The plurality of apertures 38 are shaped to selectively reduce a strength of the body 34 in an area to act as a bend initiator, such as the exemplary bend initiation lines $B_1$-$B_3$. The apertures 38 may be a selective and localized weakening of the sheet material 22. During a frontal vehicle impact and axial loading of impact forces on the front rail 20, the apertures 38 provide a selective location for the impact forces to be converted by bending the body 34 at the apertures 38. In other examples, the apertures 38 may be configured as angular bends extending transversely and disposed longitudinally along the length of the front rail. The apertures 38 may be formed by punching, stamping, or other like operations following the formation of the cross-sectional structure via roll-forming.

In additional examples, the front rail may include crush initiators, such as at the corners of the beam or the like, that weakens the body at a selective location for the impact forces to be converted by crushing the body at the crush initiator. In some examples, the crush initiators may be configured as voids, dimples, or a localized thinning of the sheet material.

Referring now to FIGS. 4 and 5, the first side wall portion 40 and the second side wall portion 42 are shown. The first side wall portion 40 (FIG. 4) and the second side wall portion (FIG. 5) may include grooves 36 and apertures 38 which act as stiffening channels and bend initiators under axial loading of impact forces. Each of the first 40 and second 42 side wall portions may additional include further holes for mounting access points, or the like.

Referring now to FIGS. 6 and 7, the top wall portion 44 and the bottom wall portion 46 are shown. The top wall portion 44 (FIG. 6) and the bottom wall portion 46 (FIG. 7) may include additional apertures 38 configured as bend initiators upon axial loading of impact forces. Each of the top 44 and bottom 46 wall portions may additional include further holes for mounting access points, or the like.

Figure 8:
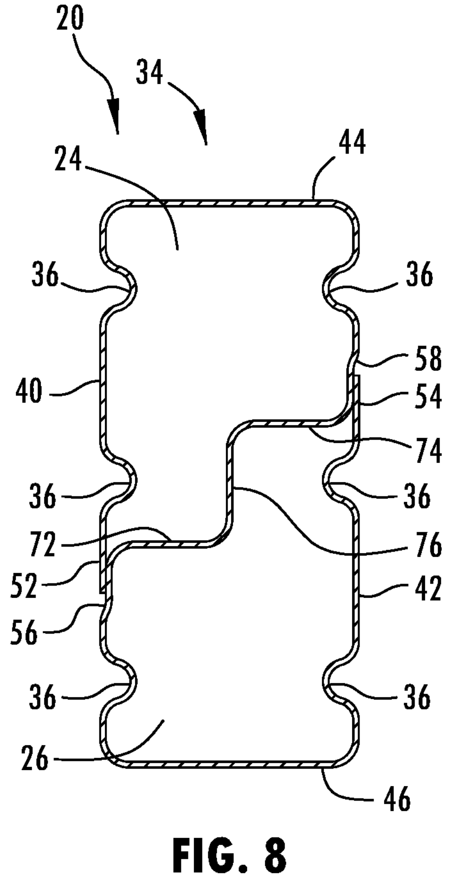
FIG. 8 is a transversal cross section of the exemplary front rail of FIG. 6 taken along line VIII-VIII.

Referring now to FIGS. 8 and 9, transverse cross-sections are shown taken from lines VIII-VIII and IX-IX of FIG. 6, respectively. The first side wall portion 40 and the second side wall portion 42 are connected via the top wall portion 44 and the bottom wall portion 46 to define a closed cross-section of the elongated body 34. The elongated body 34 may comprise of a single sheet material 22 formed, for example, via roll-forming. Alternatively, the elongated body 34 may comprise more than one sheet 22 which are attached via welding, adhesives, or the like.

The sheet material 22 includes a first edge portion 52 and a second edge portion 54 which extend along the length of the body 34. The first side wall portion 40 includes a first recessed area 56 which extends along the length of the body 34. The first recessed area 56 protrudes inward a width of the sheet material 22, such that the first edge portion 52 of the sheet material is positioned on the outer surface 48 in the first recessed area 56 and the first edge portion 52 and the front wall portion 40 are aligned.

Likewise, the second side wall portion 42 includes a second recessed area 58 which extends along the length of the body 34. The second recessed area 58 protrudes inward a width of the sheet material 22, such that when the second edge portion 54 of the sheet material is positioned on the outer surface 48 in the second recessed area 58, the second edge portion 52 and the second side wall portion 42. As shown in FIGS. 8 and 9, the first and second side wall portions 40, 42 are disposed generally in planar parallel alignment along the lengths of the body. The first and second edge portions 52, 54 may be attached to the respective first and second recessed areas 56, 58 via welding, adhesive, or the like. As shown in FIG. 9, a first weld joint 60 is formed by the inner surface 50 of the first edge portion 52 and the outer surface 48 of the first recessed area 56. Similarly, the second edge portion 54 may be attached to the second recessed area 58 via welding, adhesive, or the like, such that a second weld joint 62 is formed by the inner surface 50 of the second edge portion 54 and the outer surface 48 of the second recessed area 58.

The central wall 28 may extend from the first side wall portion 40 at the first recessed area 56 to the second side wall portion 42 at the second recessed area 58 through the interior of the elongated body 34, defining the first channel 24 and the second channel 26. The central wall 28 is configured to pass through or approximately locate at least partially along the effective longitudinal axis or central load path that extends longitudinally along the front rail. To accommodate stiffening channels 36, bend initiator holes 38, and fasteners 64 that are located at the vertical center of the beam, the central wall 28 may be formed to extend from a first vertical location below the vertical center of the beam at the first side wall portion 40 to a second vertical location above the vertical center of the beam at the second side wall portion 42, or in reverse in additional examples. As shown, for example in FIGS. 8 and 9, the central wall 28 may include a first horizontal portion 72, a second horizontal portion 74, and a vertical portion 76. The vertical portion 76 may connect the first horizontal portion 72 and the second horizontal portion 74, forming a stepped configuration. For example, the first horizontal portion 72 may extend inward from the front wall portion 40 in a direction parallel to the top 44 and bottom 46 wall portions. The first horizontal portion 72 may be integrally connected to the first recessed area 56 in a lower section 66 of the body 34. The second horizontal portion 74 may extend inward from the rear wall portion 42 in a direction parallel to the top 44 and bottom 46 wall portions. The second horizontal portion may be integrally connected to the second recessed area 58 in an upper section 70 of the body 34. The first horizontal portion 72 and the second horizontal portion 74 may have a length approximately half the width of the body 34 from the inner wall 50 of the front wall portion 40 to the inner wall 50 of the rear wall portion 42. The vertical portion 76 may extend from an innermost end of the first horizontal portion 72 to the innermost end of the second horizontal portion 74, connecting the first horizontal portion 72 and the second horizontal portion 74. The central wall 28 may include more or less horizontal and vertical portions between the front wall portion 40 and the rear wall portion 42. The corners formed between the first horizontal portion 72, the vertical portion 76, and the second horizontal portion 74 provided axial strength to the central wall 28. However, in additional examples, the portions of the central wall may have different angular transitions than 90 degrees, such as larger angles to reduce the corner bends along the central wall. The central wall 28 may have different shapes dimensions and positions. The central wall 28 may extend along the length of the beam 34 in a longitudinal direction. Alternatively, the central wall 28 may be selectively disposed along portions of the length of the beam 34. The central wall 28 may form the first channel 24 and the second channel 26 in the cross-sectional shape of the beam 34. Alternatively, the central wall 28 may define more or less channels in the cross-sectional shape of the beam 34.

Referring to FIG. 8, the plurality of grooves 36 or stiffening channels protrude inward into the cross-sectional shape from the first side wall portion 40 and the second side wall portion 42. The grooves 36 assist in the controlled deformation of the elongated body 34 during axial impact loading. The grooves 36 are discontinuous and occur only at discrete limited portions along the length of the body 34 (FIG. 3A-5). In additional embodiments, there may be more or fewer grooves 36 along the length of the body 34 and the grooves 36 may have different shapes, dimensions, and positions along the first side wall portion 40 and the second side wall portion 42. Also, the grooves 36 have a height vertically and a depth inward that is configured to allow the sheet material 22 to be formed inward in a generally curved shape without exceeding the allowable curvature (minimum capable bending radius) of the sheet material 22 without failure.

Referring to FIG. 9, the top wall portion 44 and the bottom wall portion 46 may include at least one of the plurality of apertures 38. For example, a first aperture 36 may extend through the sheet material 22 on the top wall portion 44, defining a void of material which is configured to act as a bend initiator of the body 34 during axial loading. A second aperture 36 may extend through the sheet material 22 on the bottom wall portion 46, defining a void of material which is configured to act as a bend initiator of the body 34 during axial loading. The apertures 36 may have different shapes, dimensions, and positions along the top wall portion 44 and bottom wall portion 46.

Figures 10, 11:
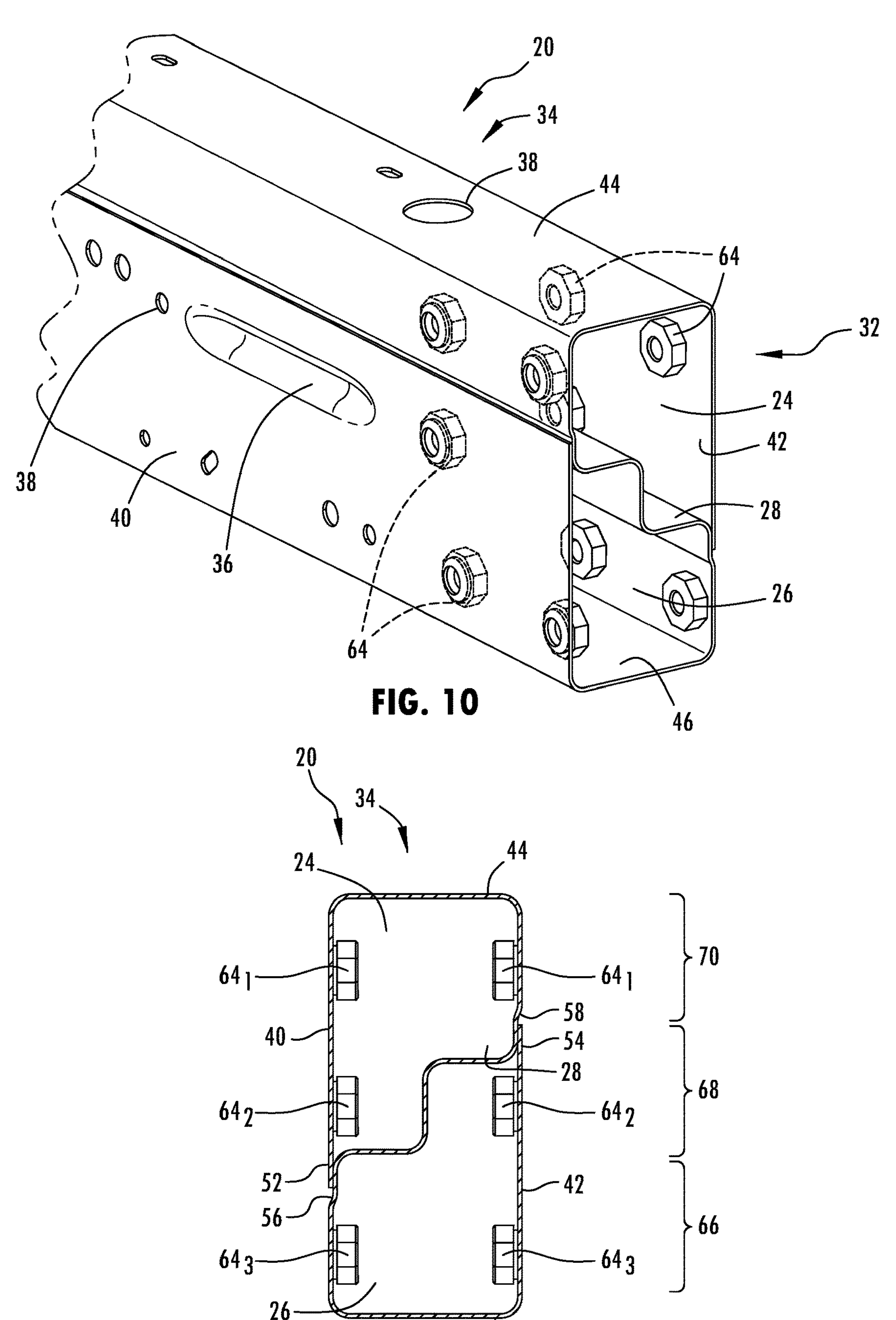
FIG. 10 is an end perspective side of the exemplary front rail of FIG. 3A.
FIG. 11 is an end view of the exemplary front rail of FIG. 3A.

Referring to FIGS. 10 and 11, the first side wall portion 40 and the second side wall portion 42 may include a plurality of fasteners 64 positioned proximate the rear end 32 for mounting the front rail 20 to the mid-frame assembly 102. The fasteners 64 are positioned in the lower section 66, the upper section 70, and a central section 68 along the height of the body 34 to optimize the strength of the connection between the front rail 20 and the mid-frame assembly 102. Alternatively, the beam 34 may include more or less fasteners 64 and the fasteners 64 may be positioned in a different locations along the height of the beam. A first pair of corresponding fasteners $\mathbf{64}_1$ are positioned in the upper section 70 of the first side wall portion 40 and the second side wall portion 42 such that they are positioned above the second horizontal portion 74 of the central wall 28. A second pair of corresponding fasteners $\mathbf{64}_3$ are positioned in the lower section 66 of the first side wall portion 40 and the second side wall portion 42 such that they are positioned below the first horizontal portion 72 of the central wall 28. A third pair of corresponding fasteners $\mathbf{64}_2$ are positioned in the central section 68 of the first side wall portion 40 and the second side wall portion 42. The third pair of fasteners $\mathbf{64}_2$ are laterally aligned with the vertical portion 76 of the central wall 28. The central wall 28 shape is configured to define space such that the third pair of fasteners $\mathbf{64}_3$ may be located in the central section 68 without contacting the central wall 28.

Figure 12:
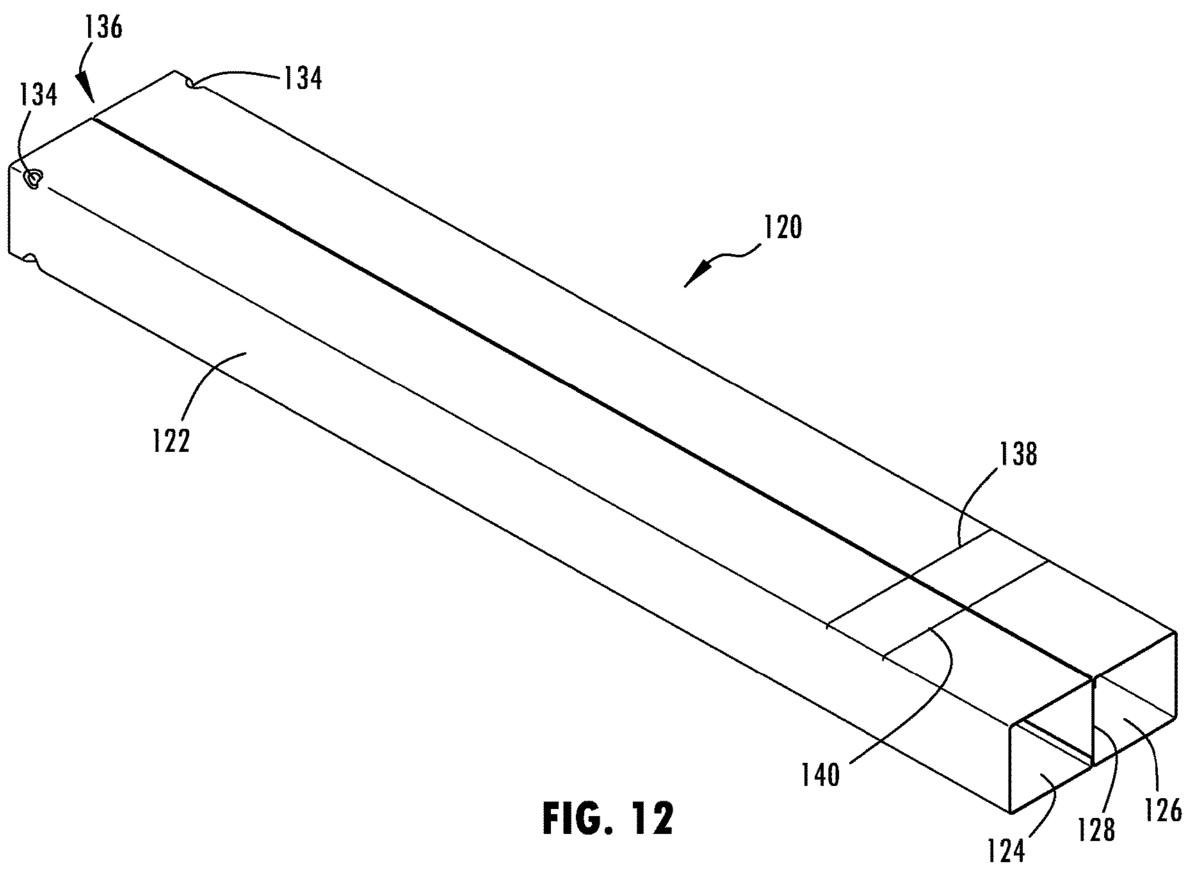
FIG. 12 is a perspective view of an exemplary front rail according to the present disclosure.
Figure 13:
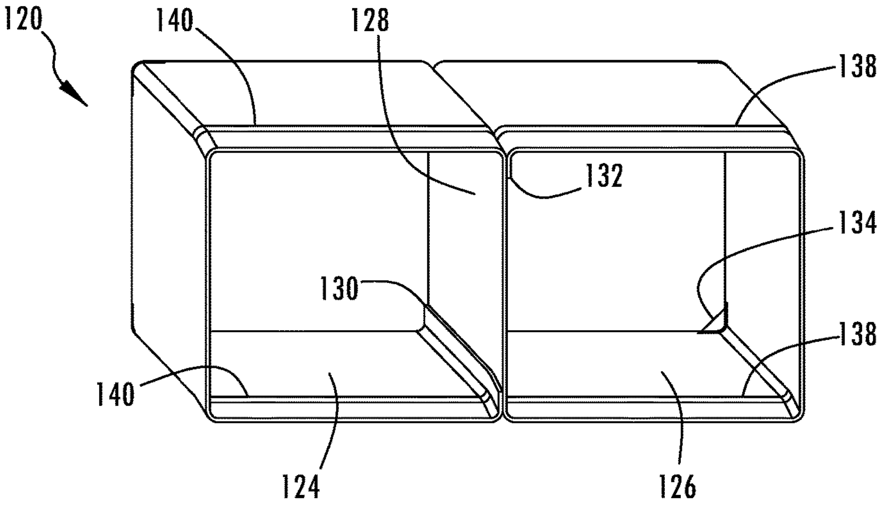
FIG. 13 is an end perspective view of the exemplary front rail of FIG. 12.

Referring now to FIGS. 12 and 13, a second exemplary front rail 120 is shown. The front rail 120 is a roll-formed structural element formed of a single sheet material 122 shaped to form a closed cross section having two hollow voids 124, 126 extending longitudinally and separated by a central wall 128. A first end 130 and a second end 132 of the material 122 are folded inward of the closed cross section and may be secured in place, such as by resistance spot welding, laser welding, or the like.

The front rail 120 includes a crush initiator 134 at a location proximate a first end 136 of the front rail 120 at each of the four edges. The first end 136 may be arranged proximate a bumper assembly when assembled in a vehicle. The front rail 120 includes a first bend initiator 138 and a second bend initiator 140. The bend initiators 138, 140 are spaced apart from each other and placed more proximate the second end 140 than the first end 136. Each bend initiator 138, 140 imparts a bend of approximately ½° in two opposed sides. Bend initiators may be in the range of at least ¼° to 2°, or preferably between ½° to less than 1°. The crush initiators 134 and the bend initiators 138, 140 may be formed by stamping operations following the formation of the cross-sectional structure via roll-forming.

Figure 14:
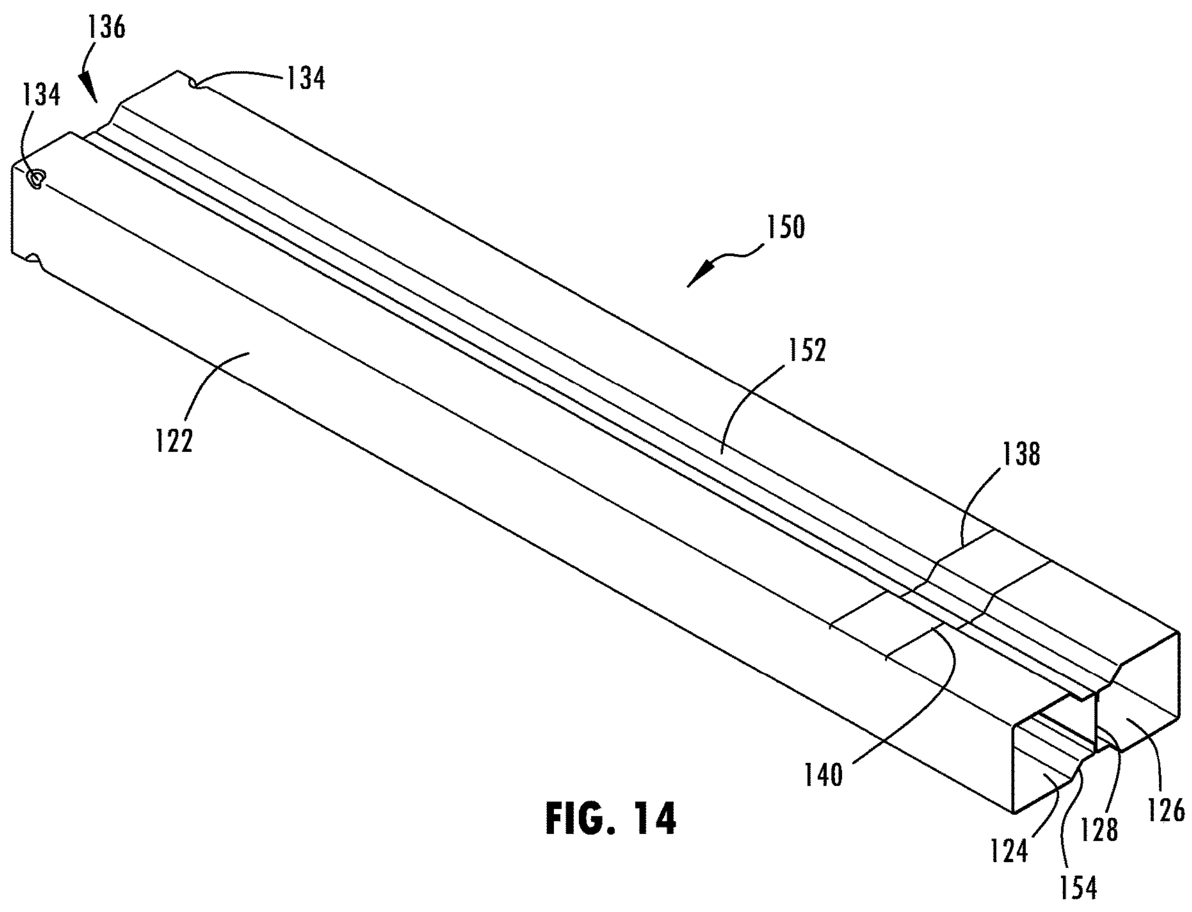
FIG. 14 is a perspective view of a second exemplary front rail according to the present disclosure.
Figure 15:
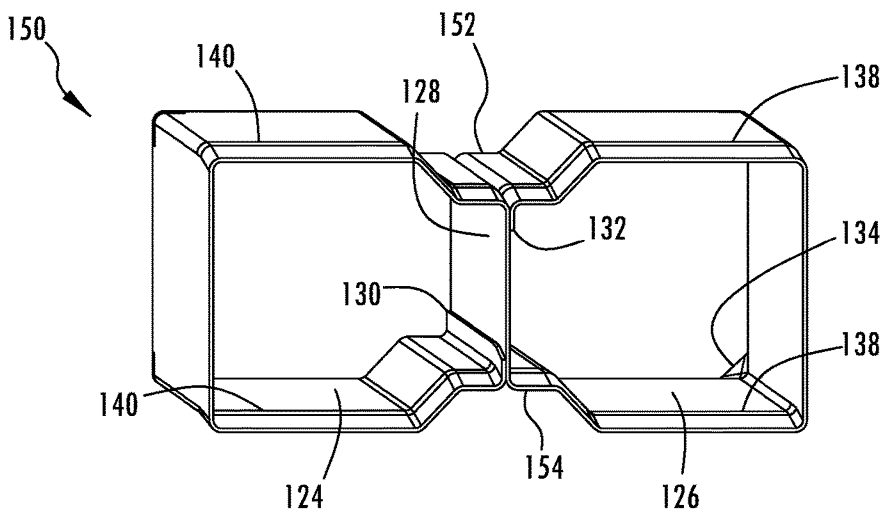
FIG. 15 is an end perspective view of the exemplary front rail of FIG. 14.

Referring now to FIGS. 14 and 15, a third exemplary front rail 150 is shown. The front rail 150 is generally similar to the second exemplary front rail 120, with the addition of two grooves 152, 154 formed in two opposing sides. The grooves 152, 154 are substantially trapezoidal channels protruding inwardly of the substantially rectangular cross-sectional shape and extending longitudinally the length of the front rail 150. As used herein, the term "substantially" means that allowances are provided for manufacturing tolerances and variability commonly found and understood in automotive components, including structural frame components, and references to a numerical, mathematical, or dimensional terms are not required to be met with perfect precision. For example in geometrical terms, a rhombus is a shape having perfectly flat, linear sides and angular vertices, but an automotive component having a substantially rhomboidal cross-sectional shape will have substantially flat sides within the manufacturing tolerances of flatness and rounded corners within a tolerance range of a bend radius prescribed by good manufacturing practices associated with the material, the material thickness, and the selected manufacturing process.

Figure 16:
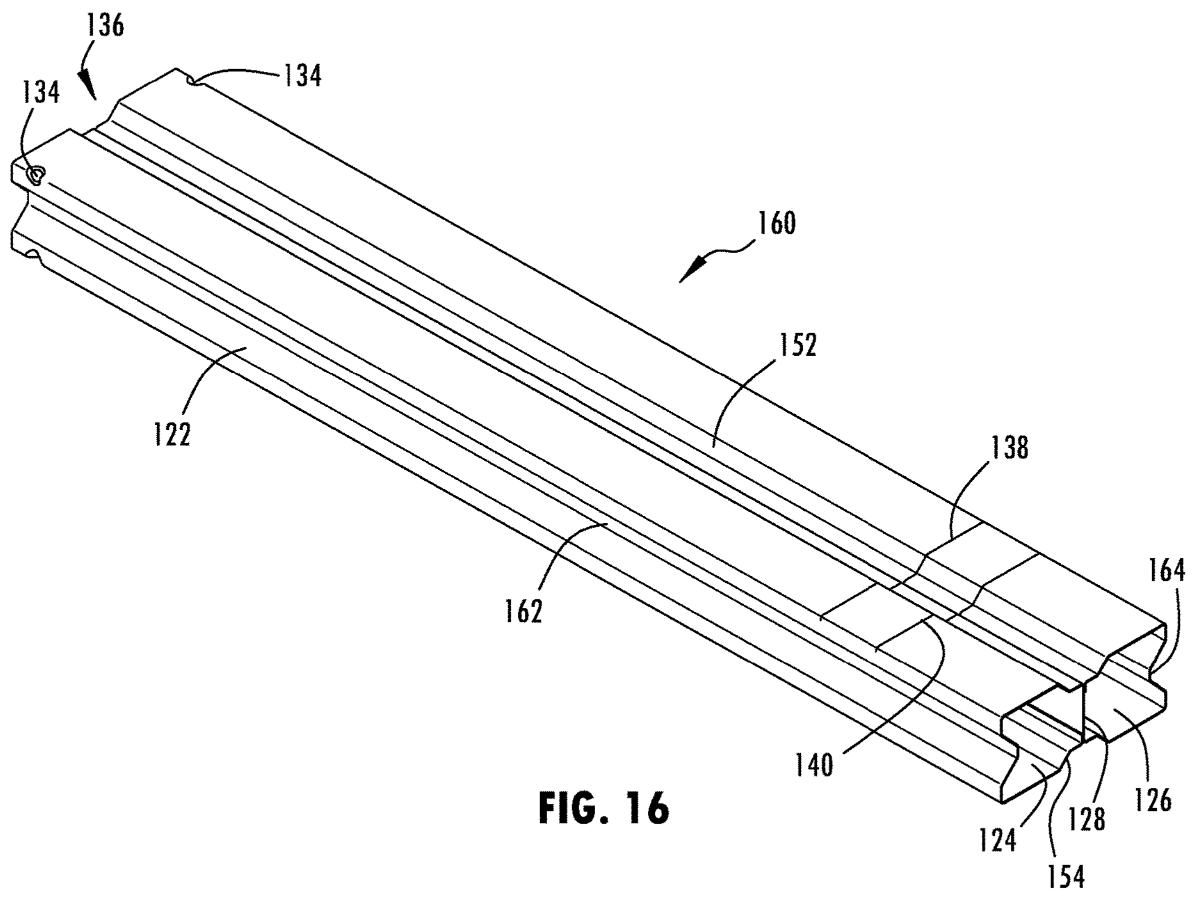
FIG. 16 is a perspective view of a third exemplary front rail according to the present disclosure.
Figure 17:
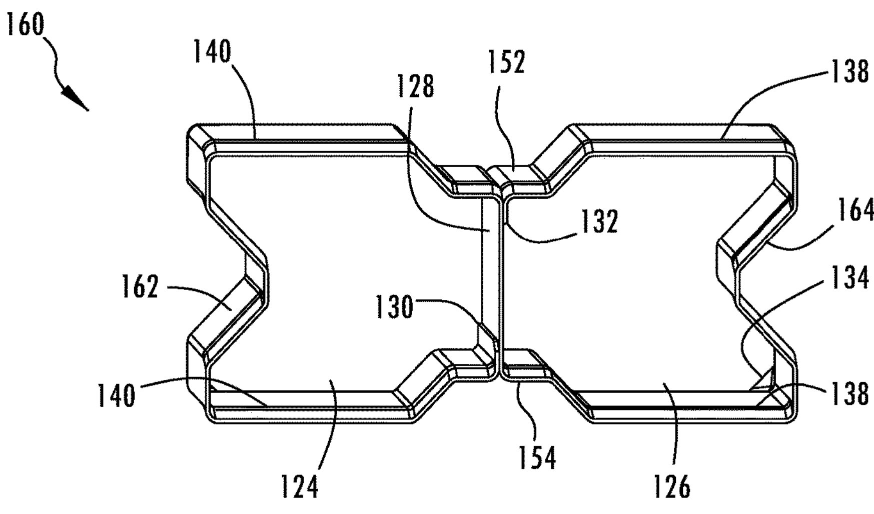
FIG. 17 is an end perspective view of the exemplary front rail of FIG. 16.

Referring now to FIGS. 16 and 17, a fourth exemplary front rail 160 is shown. The front rail 160 is generally similar to the second and third exemplary front rails 120, 150, with the addition of two grooves 162, 164 formed in two opposing sides such that each side of the substantially rectangular cross-sectional shape includes a groove. The grooves 162, 164, are substantially trapezoidal channels protruding inwardly and extending longitudinally the length of the front rail 160.

Figure 18:
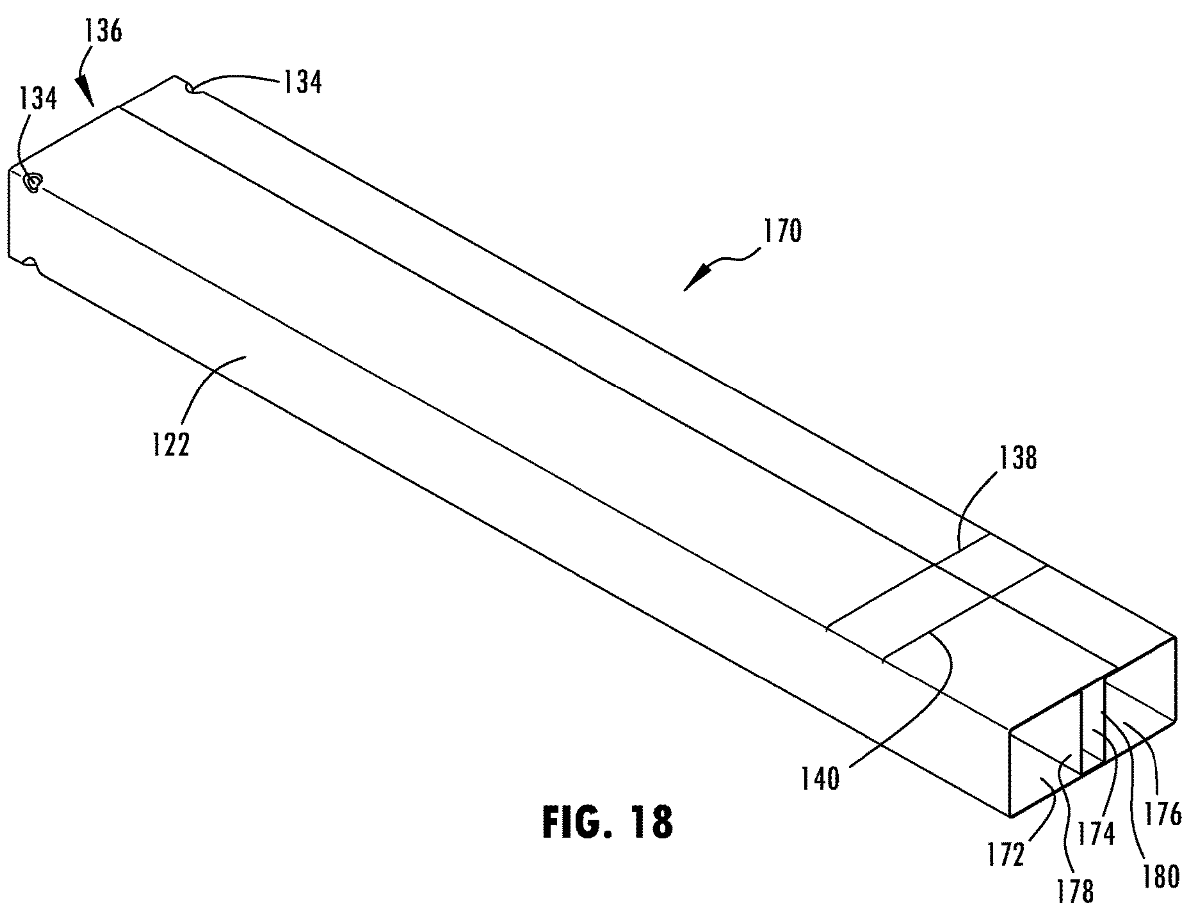
FIG. 18 is a perspective view of a fourth exemplary front rail according to the present disclosure.
Figure 19:
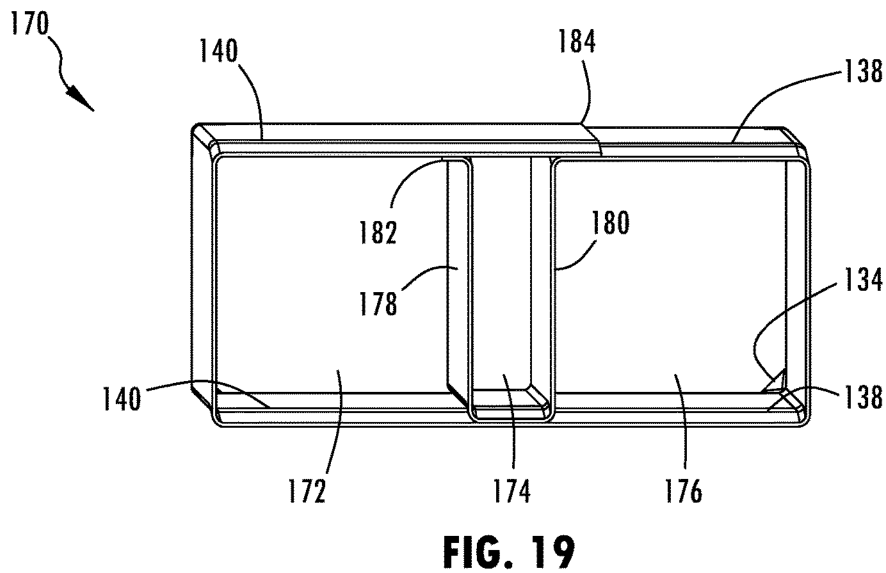
FIG. 19 is an end perspective view of the exemplary front rail of FIG. 18.

Referring now to FIGS. 18 and 19, a fifth exemplary front rail 170 is shown. The front rail 170 is a roll-formed structural element formed of a single piece of a thin plate material 122 shaped to form a closed cross section having three hollow voids 172, 174, 176 extending longitudinally and separated by two internal walls 178, 180. A first end 182 of the material 122 terminates internally of one hollow void and the second end 184 terminates tangentially to one hollow void 174. The ends 182, 184 may be secured in place, such as by resistance spot welding, laser welding or the like. The front rail 170 includes crush initiators 134 similar to the second and third exemplary front rails 120, 150. The front rail 170 also includes bend initiators 138, 140 similar to the second and third exemplary front rails 120, 150.

Figure 20:
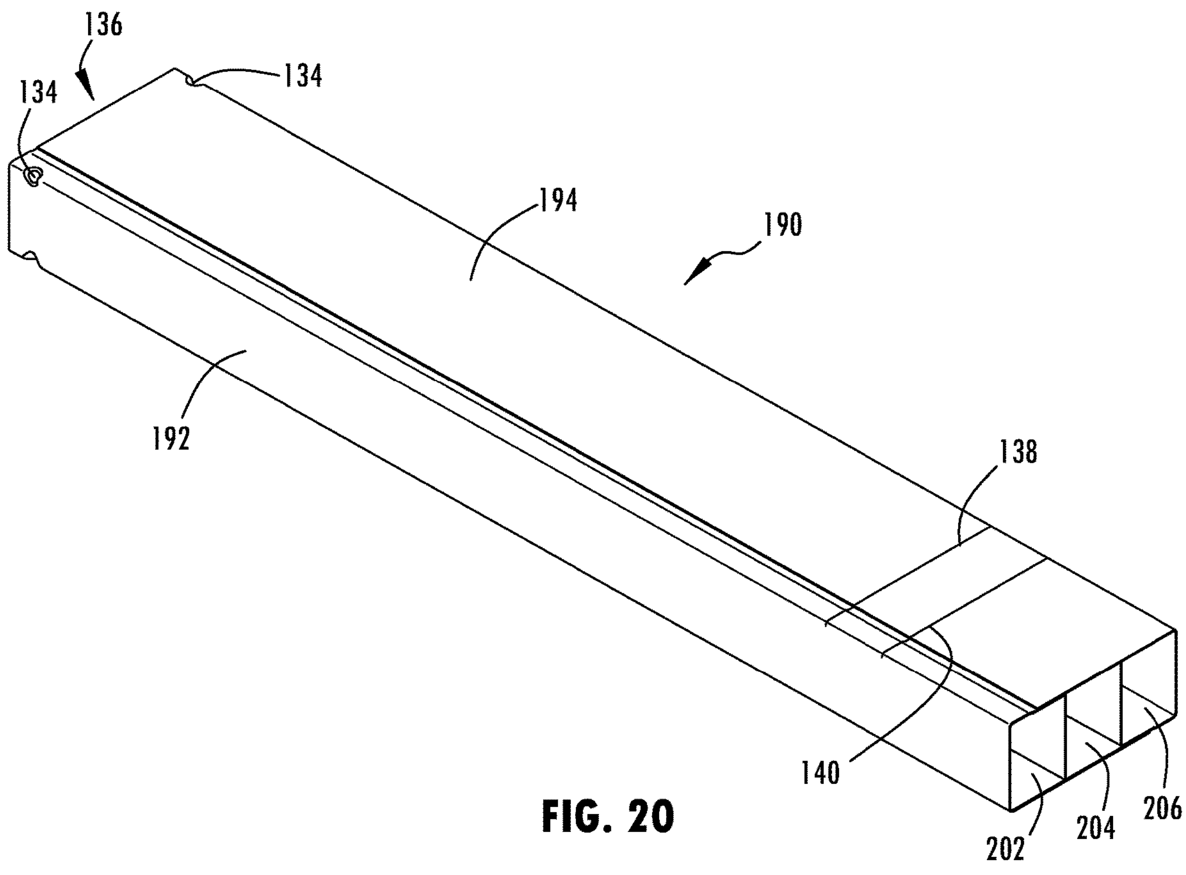
FIG. 20 is a perspective view of a fifth front rail according to the present disclosure.
Figure 21:
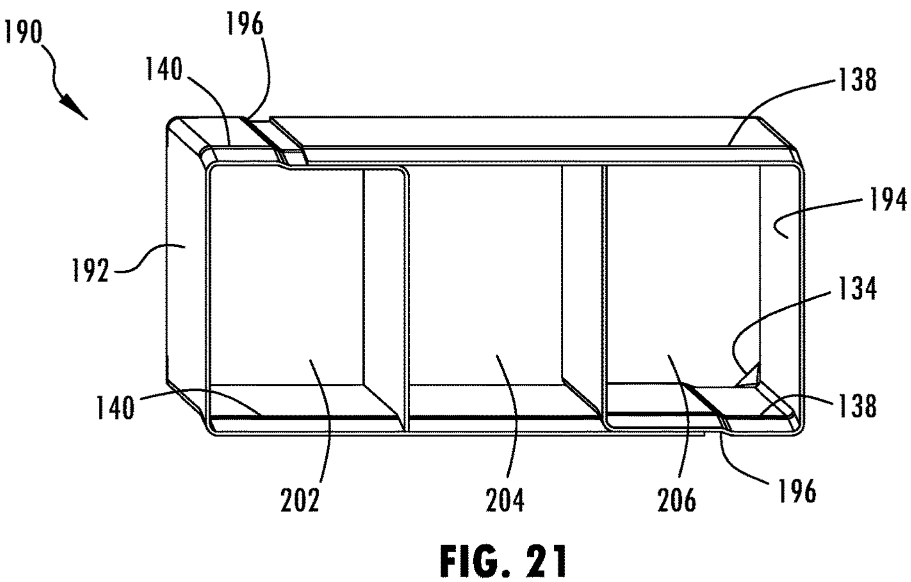
FIG. 21 is an end perspective view of the exemplary front rail of FIG. 20.

Referring now to FIGS. 20 and 21, a sixth exemplary front rail 190 is shown. The front rail 190 is a roll-formed structural element formed of two separate pieces of thin plate material 192, 194. Each piece of thin plate material 192, 194 is roll formed into a substantially P-shaped cross section, then oriented oppositely to be joined by welding, or the like. A recess 196 is formed in the P-shaped cross section so that when assembled, the ends 198, 200 form a smooth sided external shape when joined together. The resulting front rail 190 includes three hollow voids 202, 204, and 206. The front rail 190 includes crush initiators 134 similar to the prior described exemplary front rails. The front rail 190 also includes bend initiators 138, 140 similar to the prior described exemplary front rails.

Figure 22:
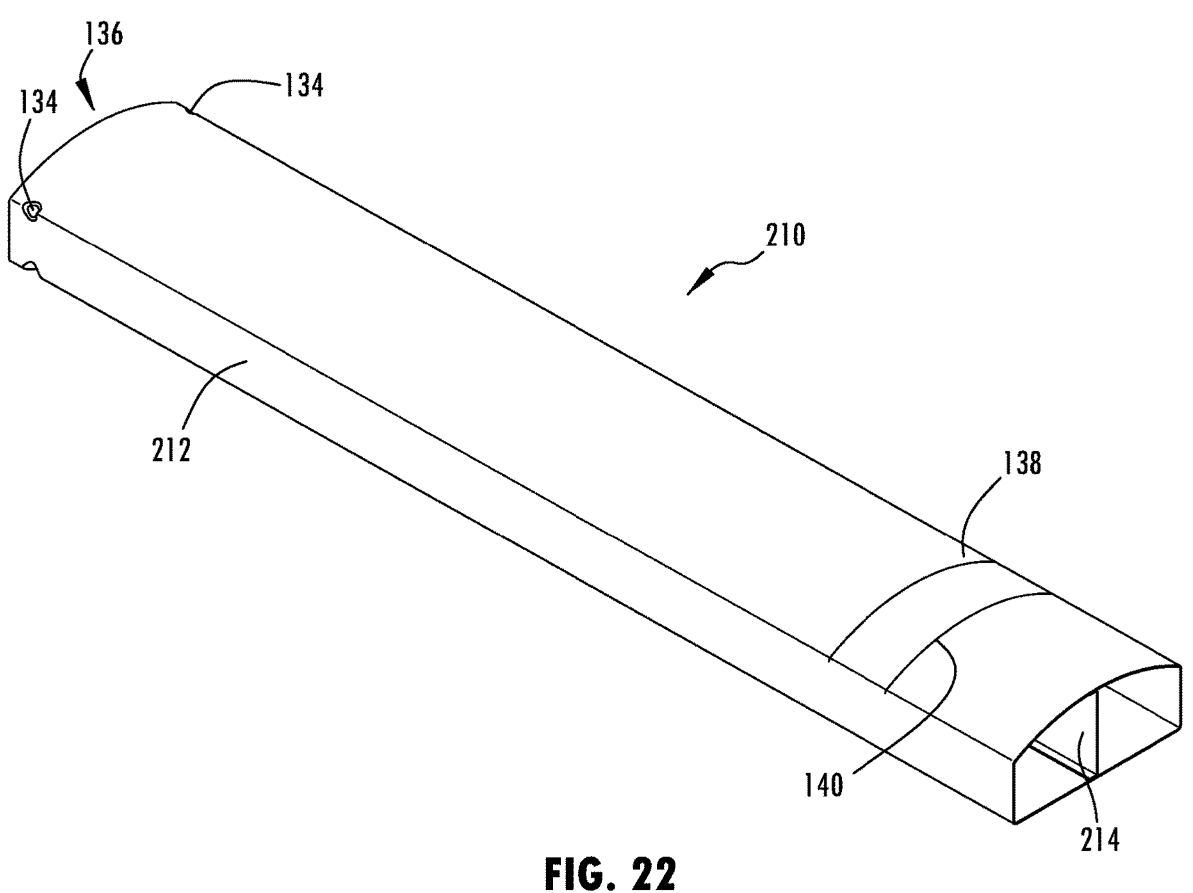
FIG. 22 is a perspective view of a sixth exemplary front rail according to the present disclosure.
Figure 23:
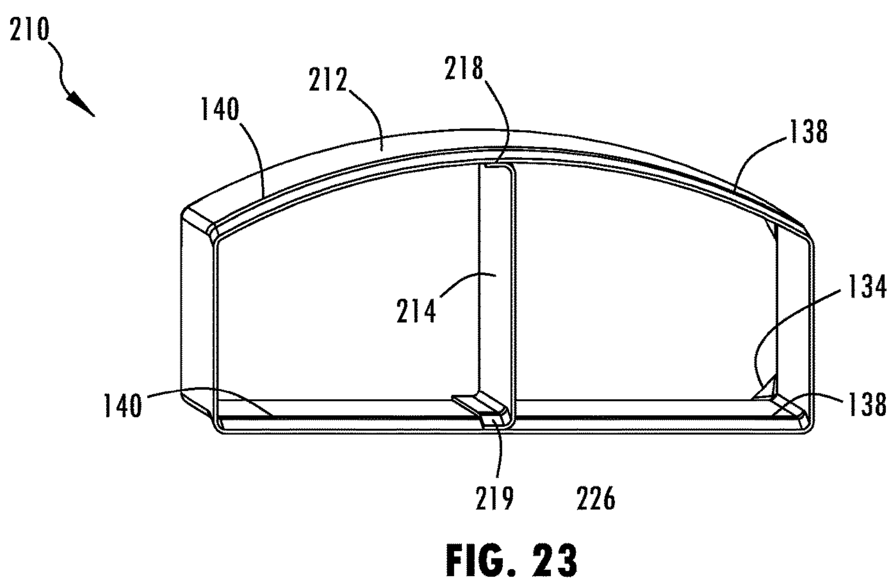
FIG. 23 is an end perspective view of the exemplary front rail of FIG. 22.

Referring now to FIGS. 22 and 23, a seventh exemplary front rail 210 is shown. The front rail 210 is a structural element formed of two separate pieces of thin plate material 212, 214. The first piece 212 forms a hollow outer shell substantially D-shaped, and may be formed, for example, by roll forming, extrusion, pultrusion, or other similar process. The second piece 214 forms an internal wall 216 with first and second flanges 218, 219, dividing the hollow shell formed from the first piece 212. The second piece 214 may be added to the first piece 212 once formed, and secured in place by welding, bonding, or other suitable process according to the materials employed. The front rail 210 includes crush initiators 134 similar to the prior described exemplary front rails. The front rail 210 also includes bend initiators 138, 140 similar to the prior described exemplary front rails.

Figure 24:
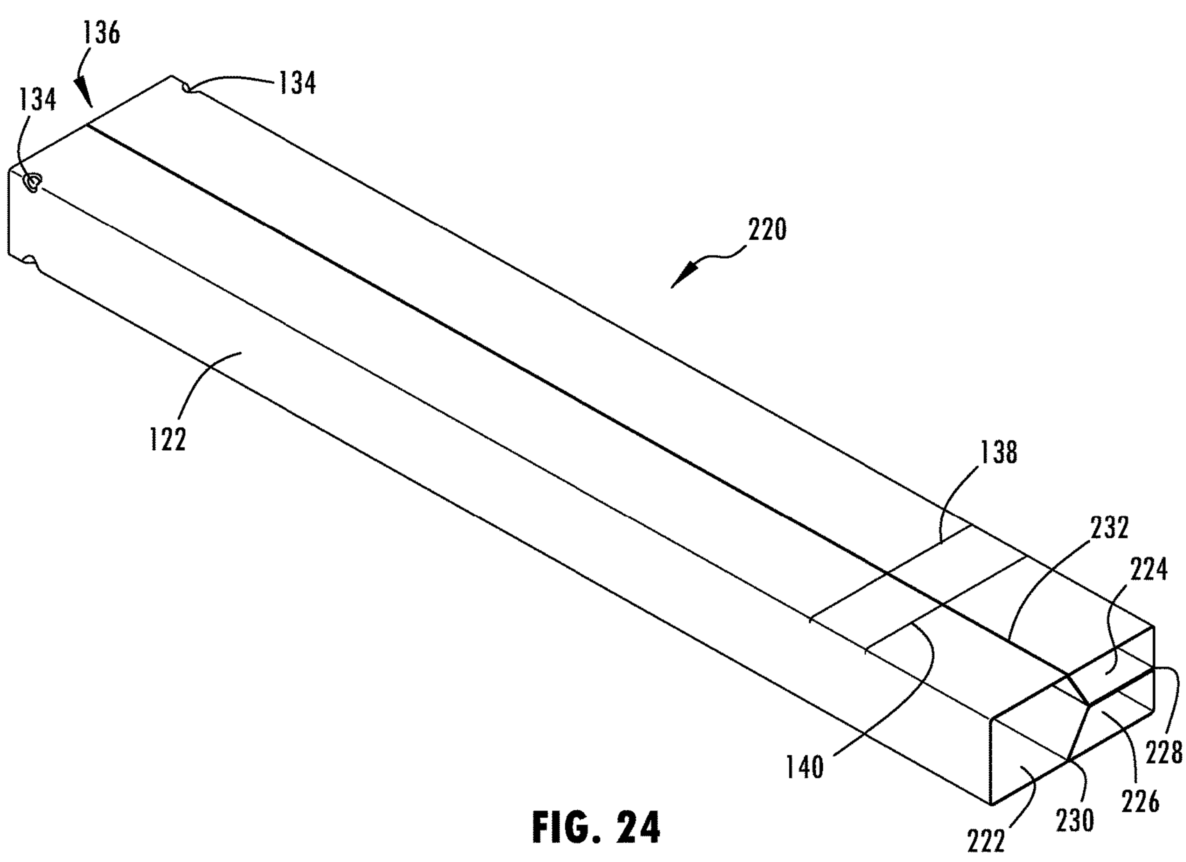
FIG. 24 is a perspective view of a seventh exemplary front rail according to the present disclosure.
Figure 25:
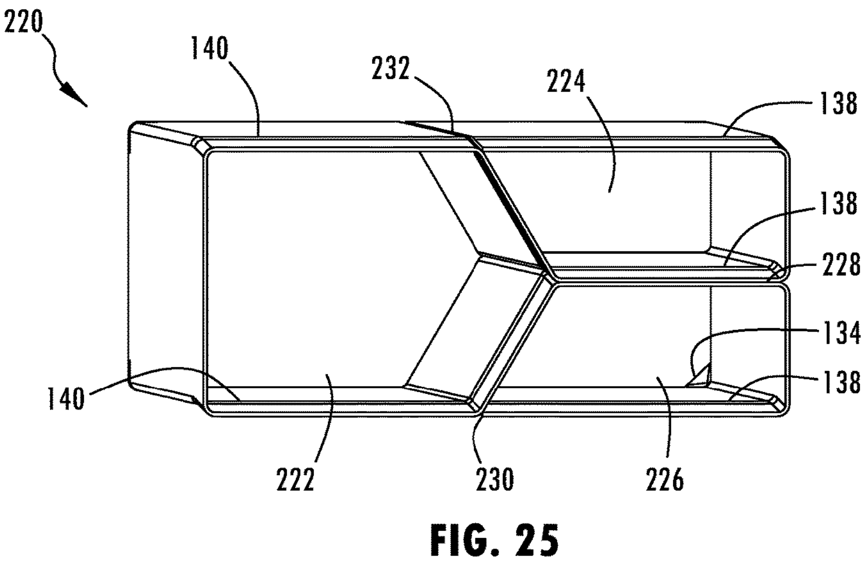
FIG. 25 is an end perspective view of the exemplary front rail of FIG. 24.

Referring now to FIGS. 24 and 25, a eighth exemplary front rail 220 is shown. The front rail 220 is a roll-formed structural element formed of a single piece of thin plate material. The front rail 220 includes three hollow voids 222, 224, 226 extending longitudinally the length of the front rail 220. The front rail 220 includes a double-thickness internal wall 228, offering increased rigidity to axially loading. The ends 230, 232 terminate tangentially to the first hollow void 222, and can be secured in place, for example, by welding, such as resistive spot welding, laser welding, or the like. The front rail 220 includes crush initiators 134 similar to the prior described exemplary front rails. The front rail 220 also includes bend initiators 138, 140 similar to the prior described exemplary front rails.

Figure 26:
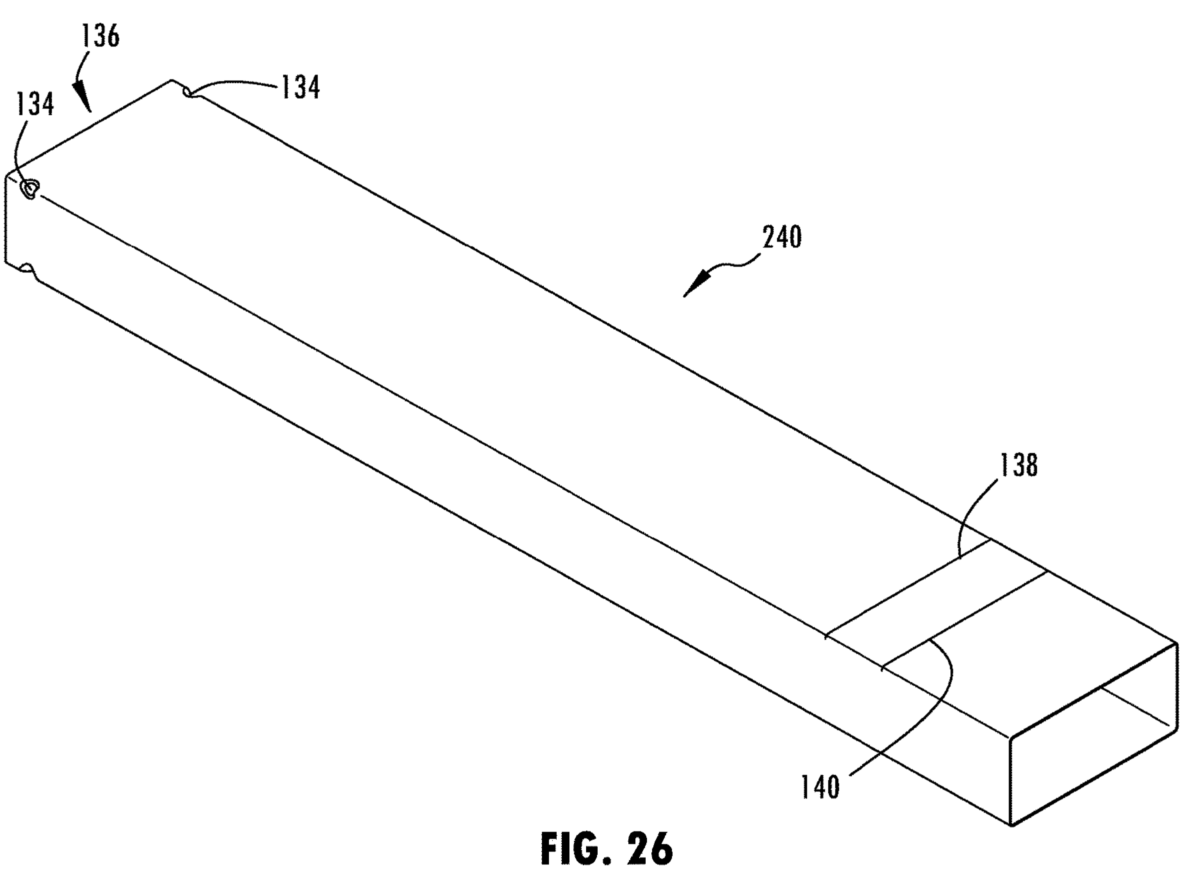
FIG. 26 is a perspective view of an eighth exemplary front rail according to the present disclosure.
Figure 27:
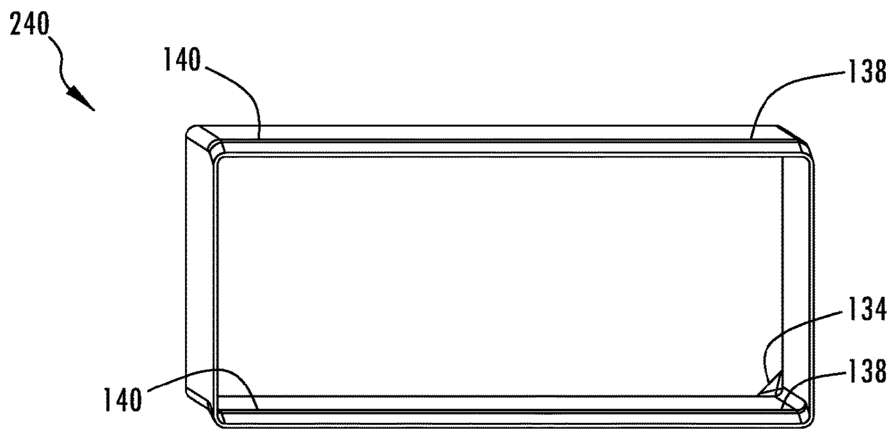
FIG. 27 is an end perspective view of the exemplary front rail of FIG. 26.

Referring now to FIGS. 26 and 27, an ninth exemplary front rail 240 is shown. The front rail 240 has a closed, substantially rectangular cross-sectional shape. The front rail 240 may be formed by roll forming, extrusion, pultrusion or the like. The front rail 240 includes crush initiators 134 similar to the prior described exemplary front rails. The front rail 240 also includes bend initiators 138, 140 similar to the prior described exemplary front rails.

Figure 28:
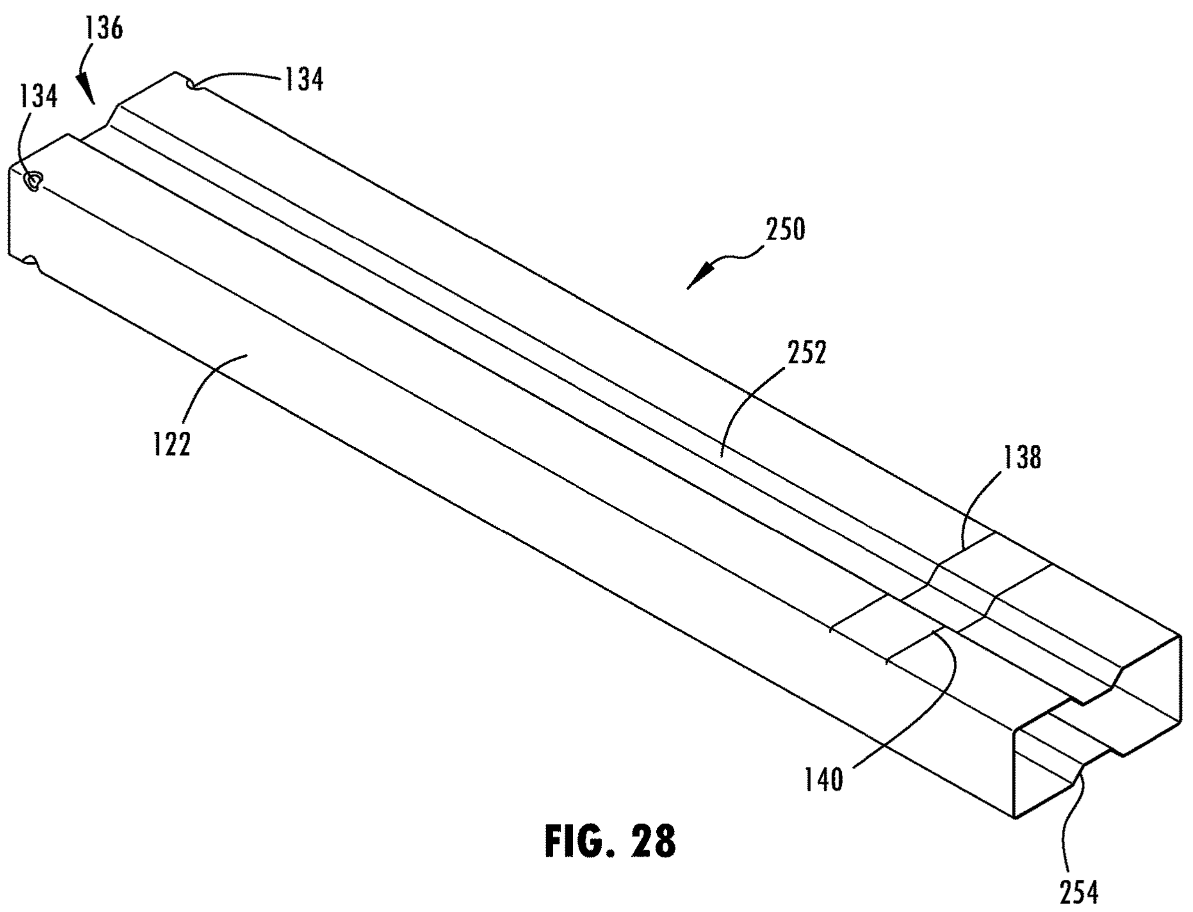
FIG. 28 is a perspective view of a ninth exemplary front rail according to the present disclosure.
Figure 29:
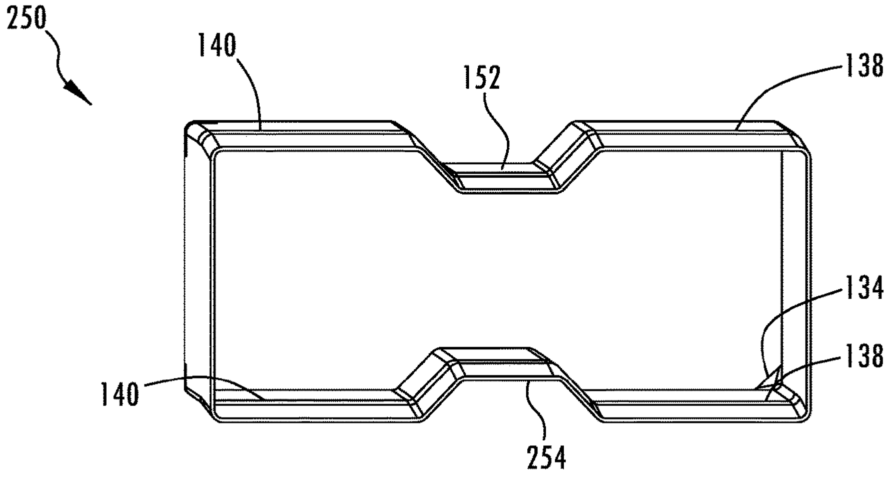
FIG. 29 is an end perspective view of the exemplary front rail of FIG. 28.

Referring now to FIGS. 28 and 29, a tenth exemplary front rail 250 is shown. The front rail 250 is generally similar to the front rail 240 of the ninth embodiment, with the addition of two grooves 252, 254 formed in two opposing sides. The grooves 252, 254 are substantially trapezoidal channels protruding inwardly of the substantially rectangular cross-sectional shape and extending longitudinally the length of the front rail 250.

Figure 30:
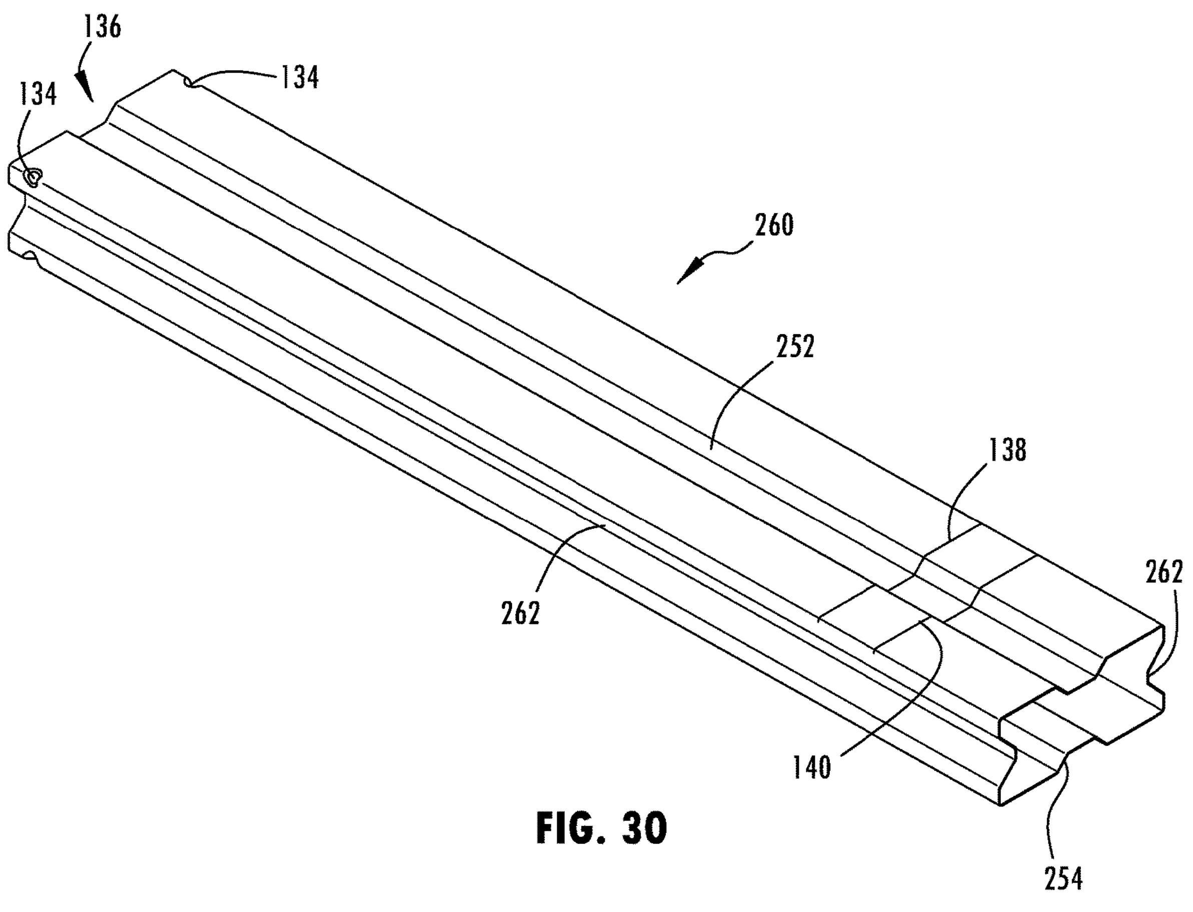
FIG. 30 is a perspective view of a tenth exemplary front rail according to the present disclosure.
Figure 31:
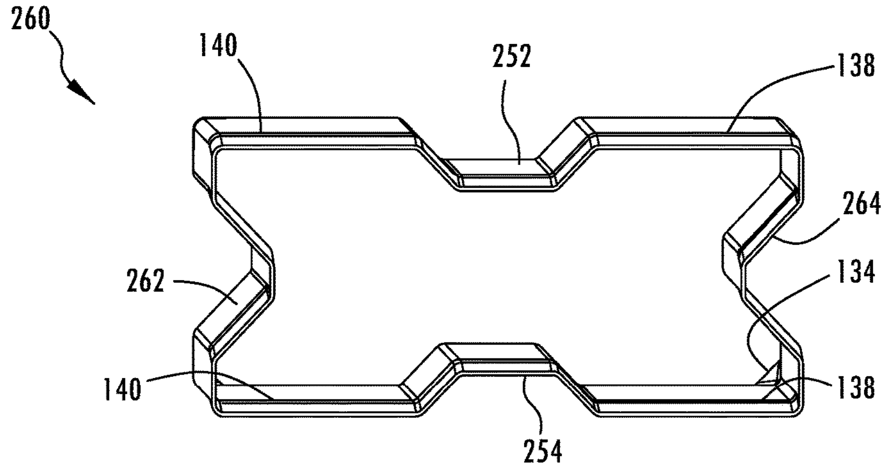
FIG. 31 is an end perspective view of the exemplary front rail of FIG. 30.

Referring now to FIGS. 30 and 31, a eleventh exemplary front rail 260 is shown. The front rail 260 is generally similar to the front rails 240, 250 of the ninth and tenth embodiments, with the addition of two grooves 262, 264 formed in two opposing sides such that each side of the substantially rectangular cross-section shape includes a groove. The grooves 262, 264 are substantially trapezoidal channels protruding inwardly and extending longitudinally the length of the front rail 260.

Figure 32:
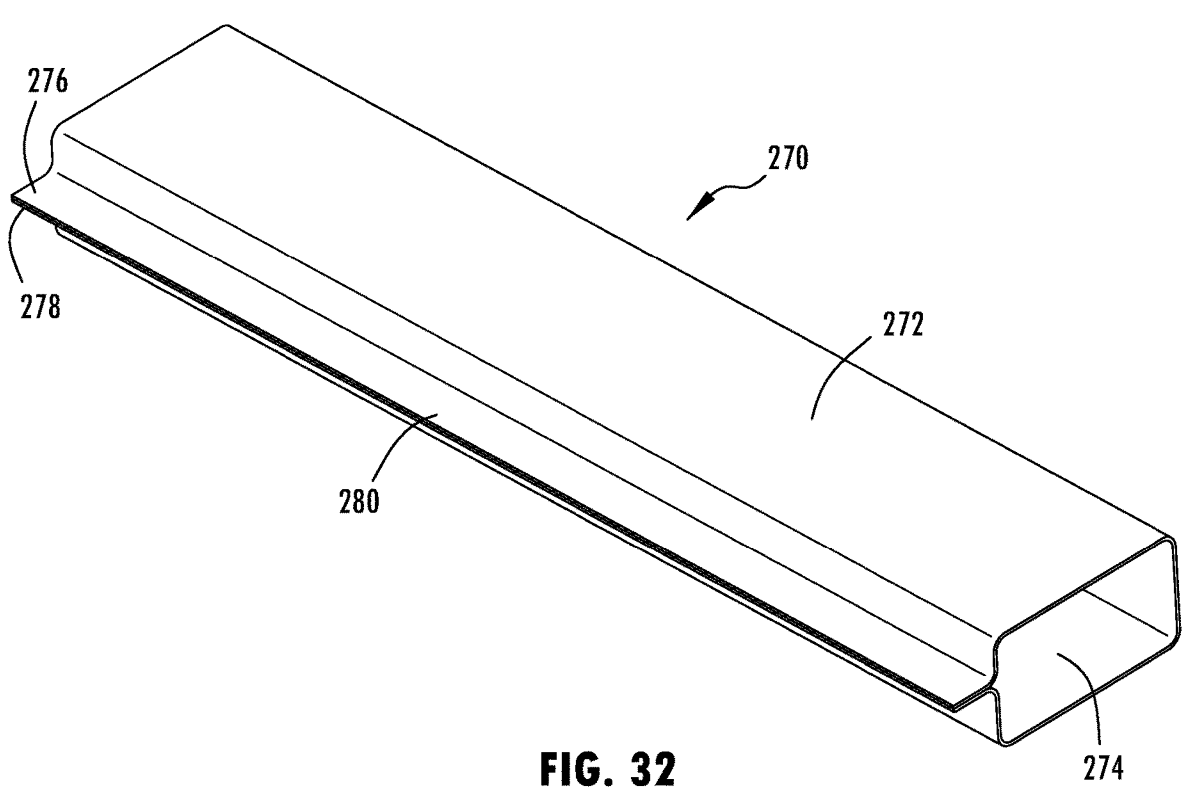
FIG. 32 is a perspective view of an eleventh exemplary front rail according to the present disclosure.
Figure 33:
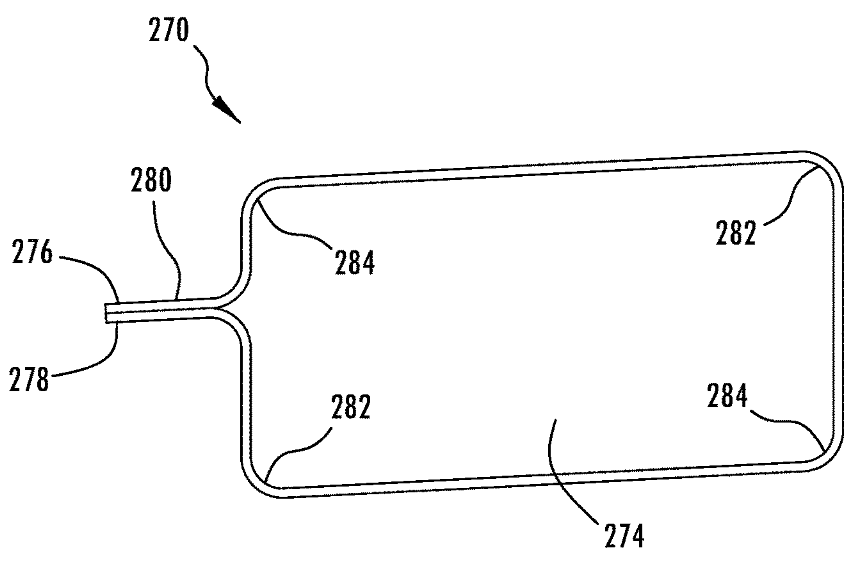
FIG. 33 is an end view of the exemplary front rail of FIG. 32.

Referring now to FIGS. 32 and 33, a twelfth exemplary front rail 270 is shown. The front rail 270 is a structural element formed of a single piece of thin plate material 272 shaped to form a closed cross section having a single hollow void 274 extending longitudinally the length of the front rail 270. The ends 276, 278 of the thin plate material 272 extend outwardly from the closed cross section as a single flange 280. The flange 280 may be disposed off-center relative to the cross-sectional shape. The ends 276, 278 may be secured together by welding, such as resistance spot welding, laser welding, or the like. The closed cross section of the front rail 270 defines a shape substantially as a parallelogram with two pairs of substantially parallel sides which are arranged at a first pair of acute angles 282 and a second pair of obtuse angles 284. The acute angles 282 may be about 87° and the obtuse angles 284 may be about 93°. In other alternatives, the acute angles 282 may be between 80° up to 89° and the obtuse angles 284 may be between 91° to 100°.

Figure 34:
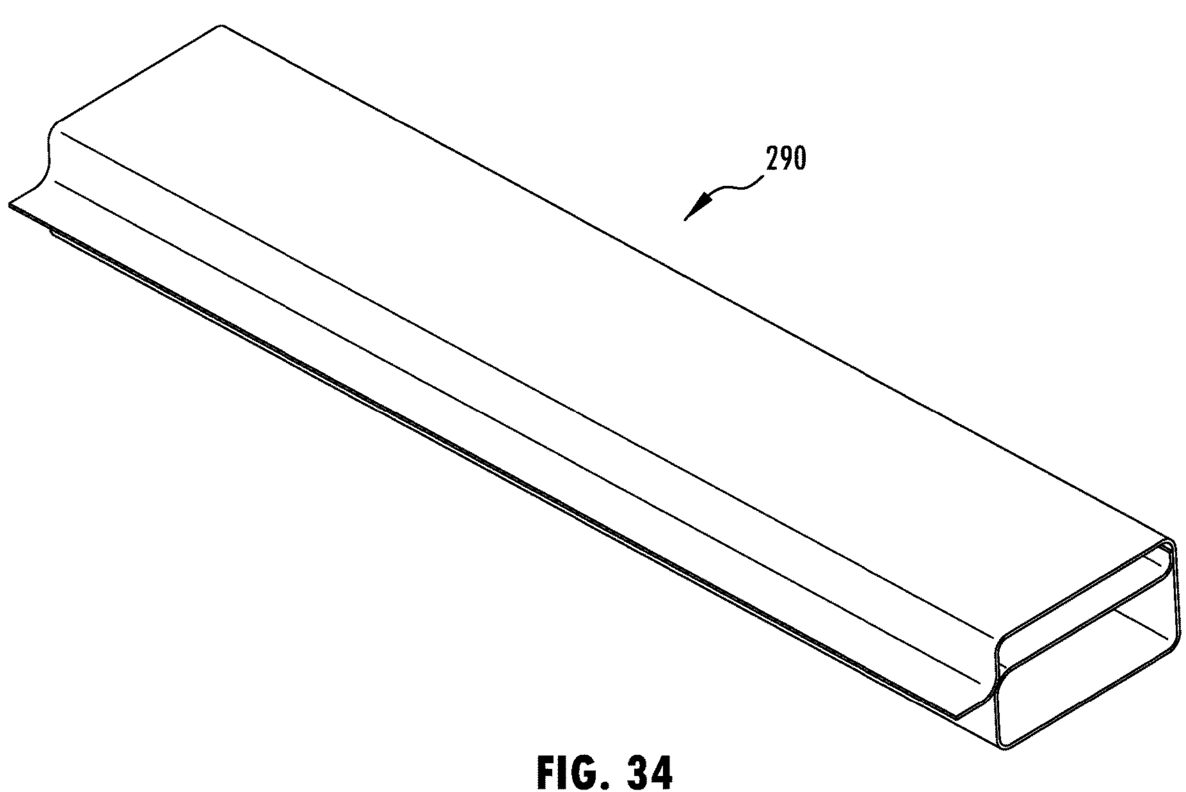
FIG. 34 is a perspective view of a twelfth exemplary front rail according to the present disclosure.
Figure 35:
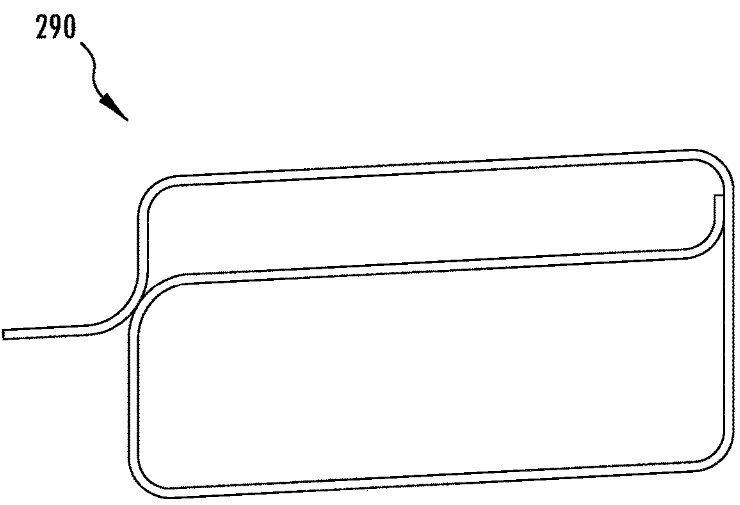
FIG. 35 is an end view of the exemplary front rail of FIG. 34.

Referring now to FIGS. 34 and 35, a thirteenth exemplary front rail 290 is shown. The front rail 290 is a structural element formed similar to the front rail 270 described above, with an alternative cross-sectional shape as illustrated which extends longitudinally the length of the front rail 290. A first end of the thin plate material extends outward from the closed cross-section as a single flange with the second end of the thin plate material folded inward to form a central wall in the cross-section.

Figure 36:
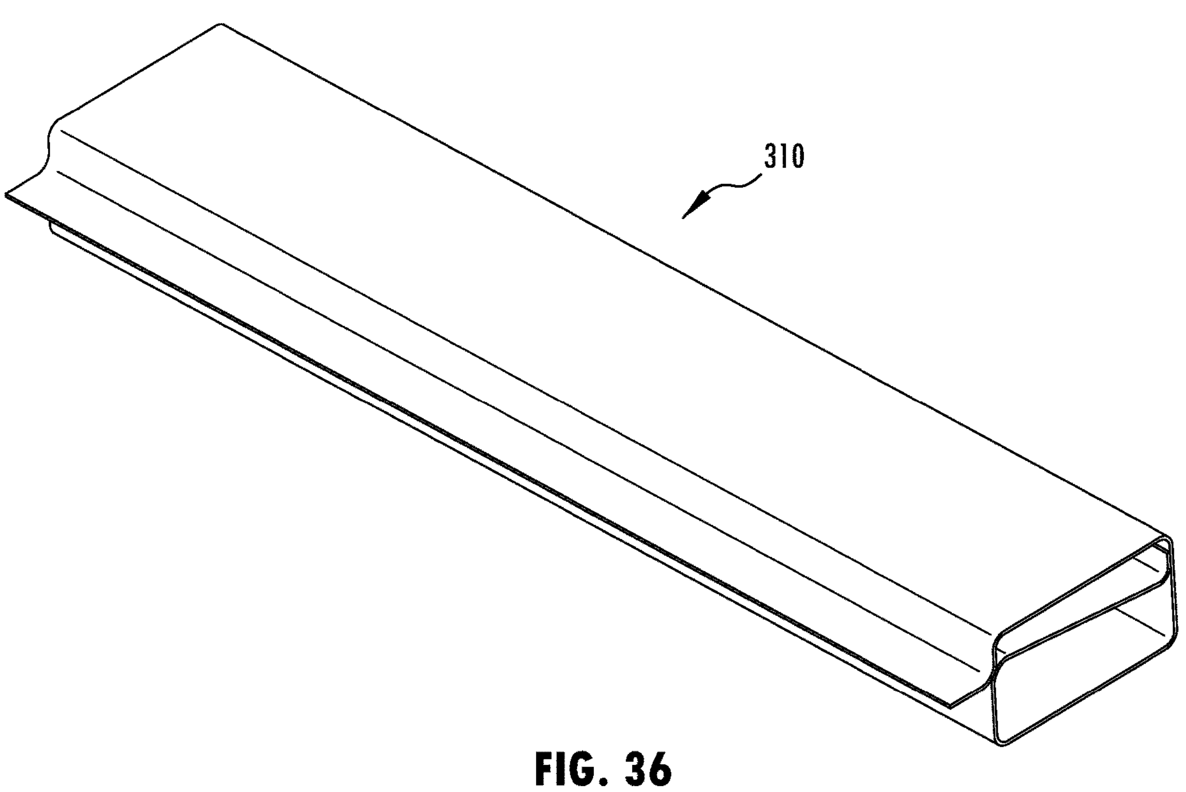
FIG. 36 is a perspective view of a thirteenth exemplary front rail according to the present disclosure.
Figure 37:
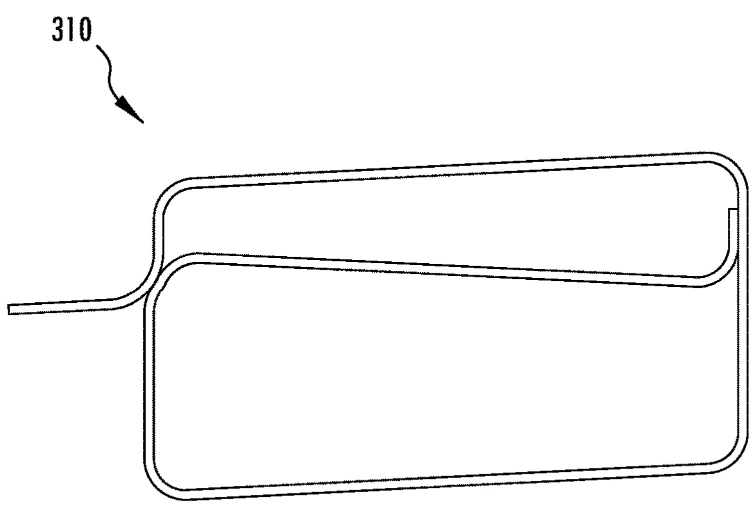
FIG. 37 is an end view of the exemplary front rail of FIG. 36.

Referring now to FIGS. 36 and 37, a fourteenth exemplary front rail 310 is shown. The front rail 310 is a structural element formed similar to the front rails 270, 290 described above, with an alternative cross-sectional shape as illustrated which extends longitudinally the length of the front rail 310. A first end of the thin plate material extends outward from the closed cross-section as a single flange with the second end of the thin plate material folded inward to form a central wall in the cross-section.

Figure 38:
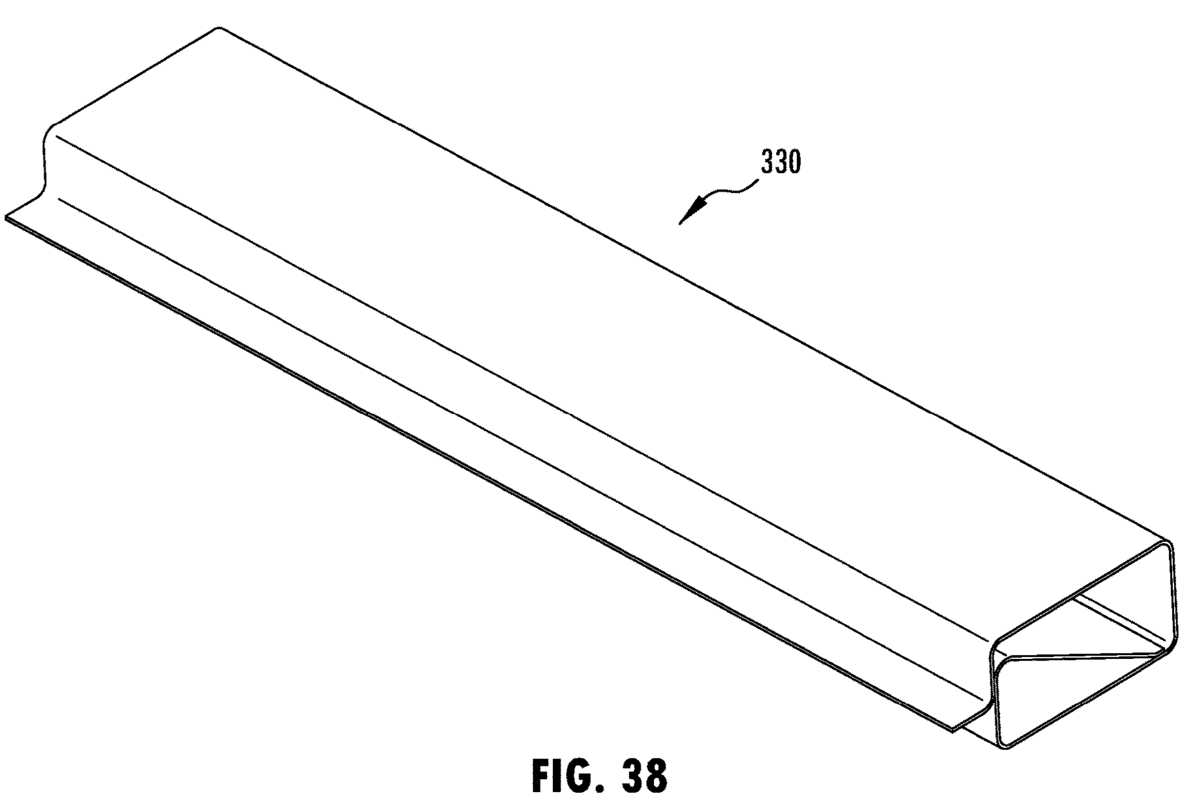
FIG. 38 is a perspective view of a fourteenth exemplary front rail according to the present disclosure.
Figure 39:
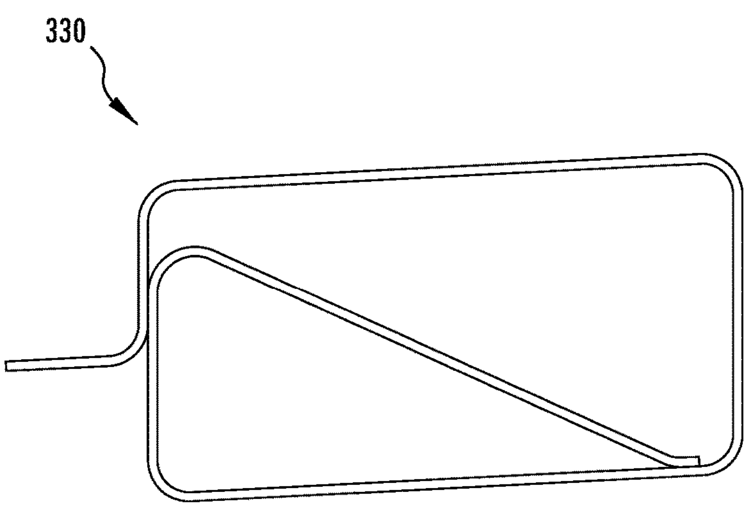
FIG. 39 is an end view of the exemplary front rail of FIG. 38.

Referring now to FIGS. 38 and 39, a fifteenth exemplary front rail 330 is shown. The front rail 330 is a structural element formed similar to the front rails 270-310 described above, with an alternative cross-sectional shape as illustrated which extends longitudinally the length of the front rail 330. A first end of the thin plate material extends outward from the closed cross-section as a single flange with the second end of the thin plate material folded inward to form a central wall in the cross-section.

Figure 40:
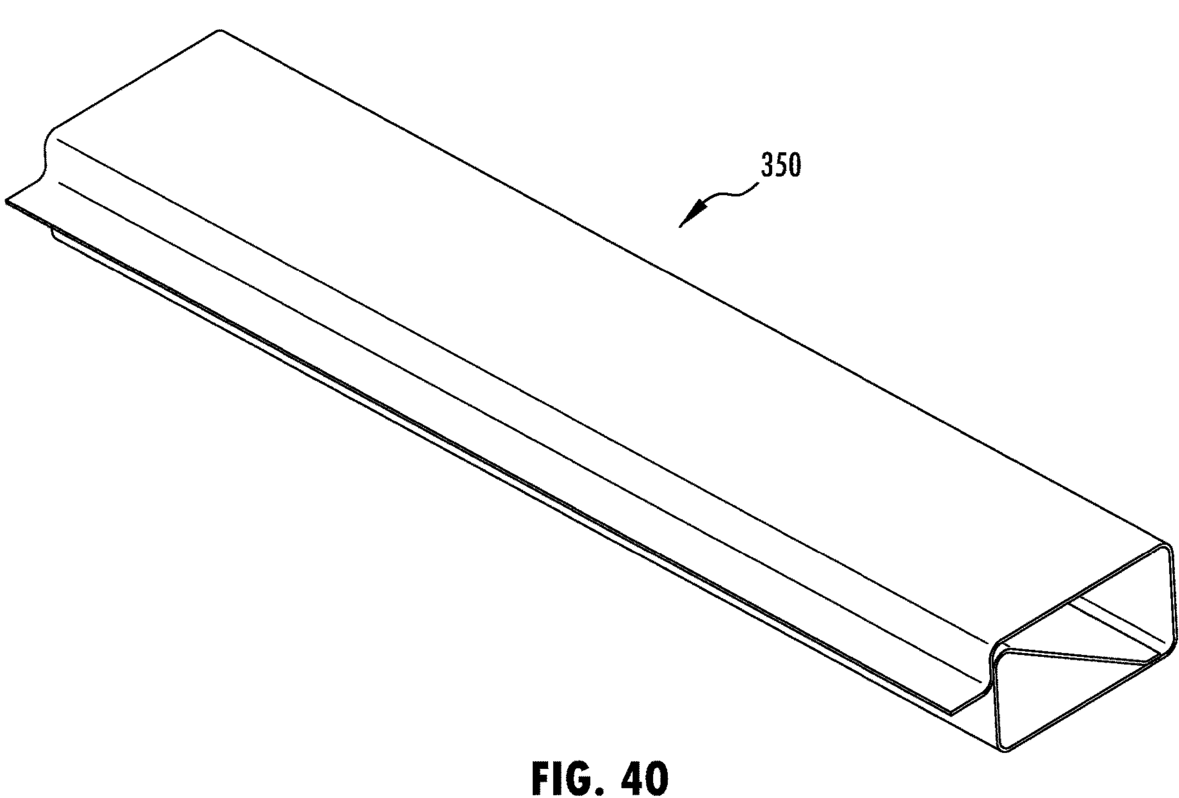
FIG. 40 is a perspective view of a fifteenth exemplary front rail according to the present disclosure.
Figure 41:
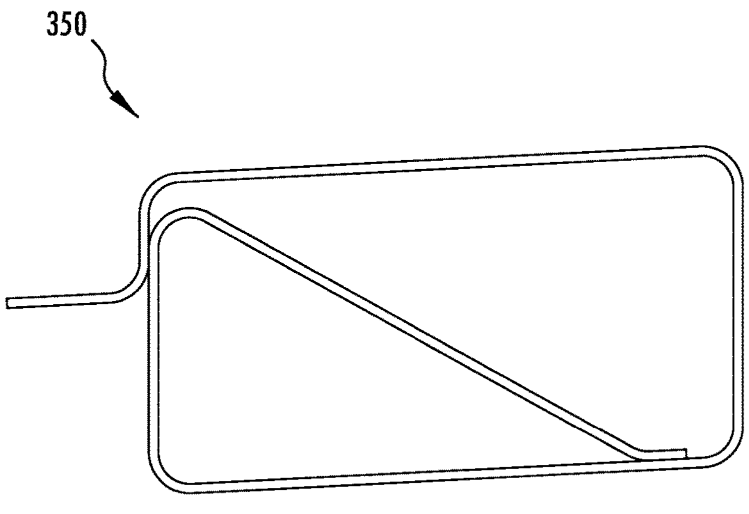
FIG. 41 is an end view of the exemplary front rail of FIG. 40.

Referring now to FIGS. 40 and 41, a sixteenth exemplary front rail 350 is shown. The front rail 350 is a structural element formed similar to the front rails 270-330 described above, with an alternative cross-sectional shape as illustrated which extends longitudinally the length of the front rail 350. A first end of the thin plate material extends outward from the closed cross-section as a single flange with the second end of the thin plate material folded inward to form a central wall in the cross-section.

Figure 42:
FIG. 42 is a perspective view of a sixteenth exemplary front rail according to the present disclosure.
Figure 42:
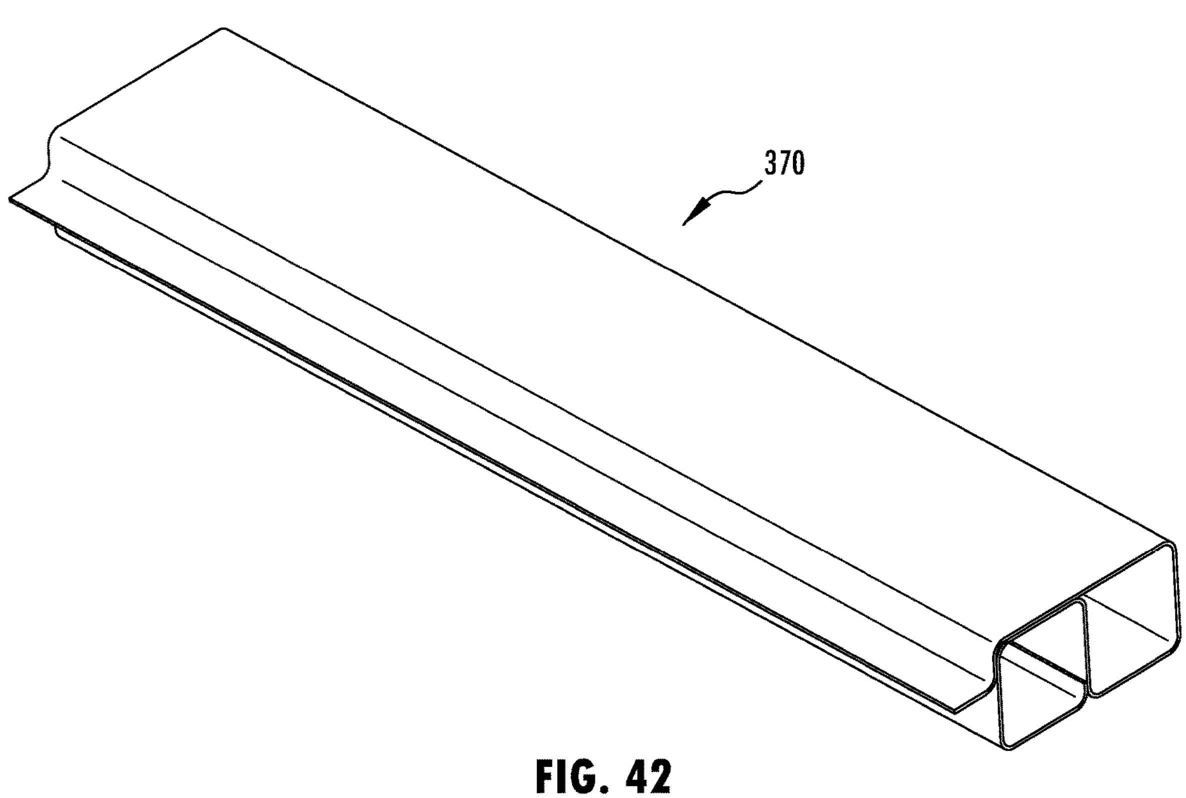
Figure 43:
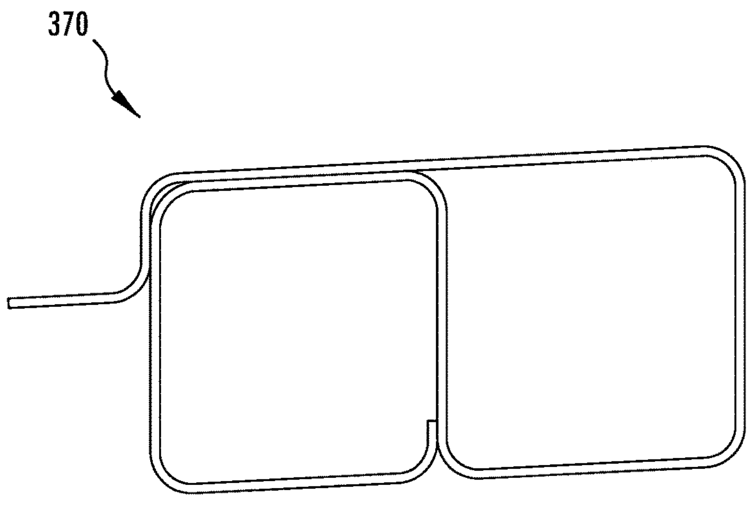
FIG. 43 is an end view of the exemplary front rail of FIG. 42.

Referring now to FIGS. 42 and 43, a seventeenth exemplary front rail 370 is shown. The front rail 370 is a structural element formed similar to the front rails 270-350 described above, with an alternative cross-sectional shape as illustrated which extends longitudinally the length of the front rail 370. A first end of the thin plate material extends outward from the closed cross-section as a single flange with the second end of the thin plate material folded inward to form a central wall in the cross-section.

Figure 44:
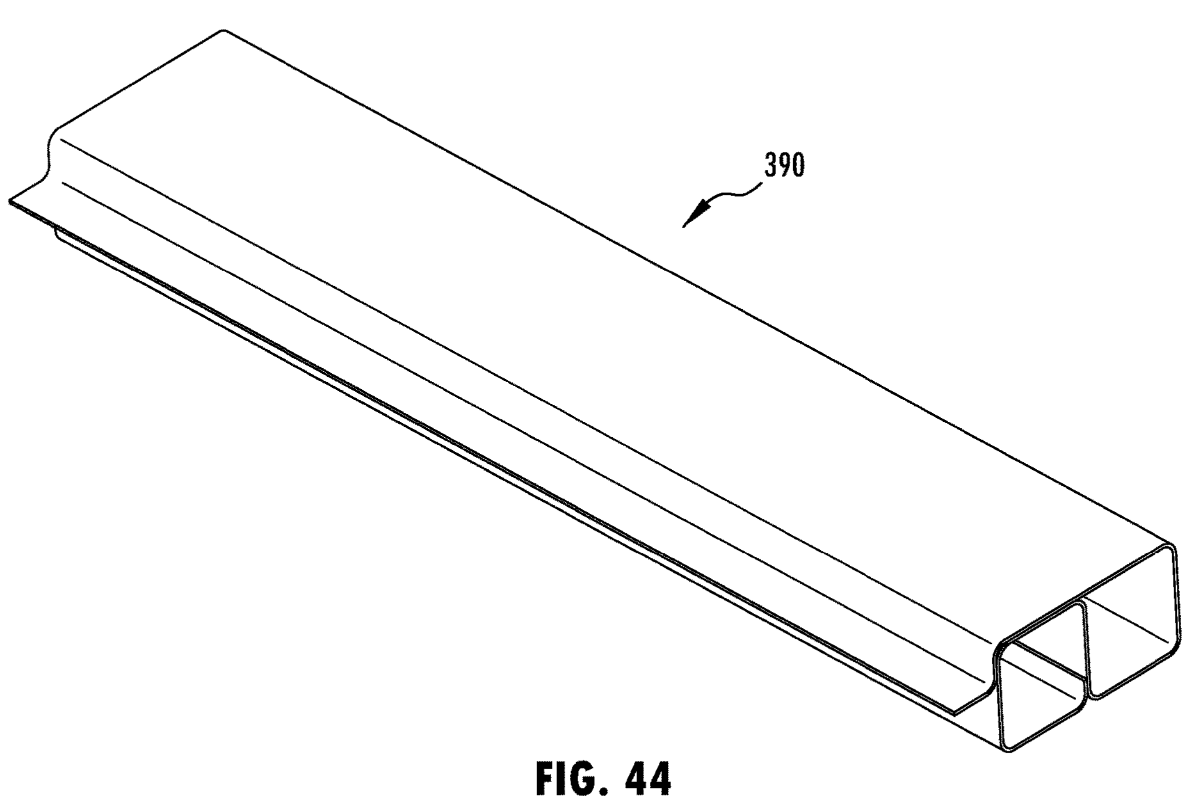
FIG. 44 is a perspective view of a seventeenth exemplary front rail according to the present disclosure.
Figure 45:
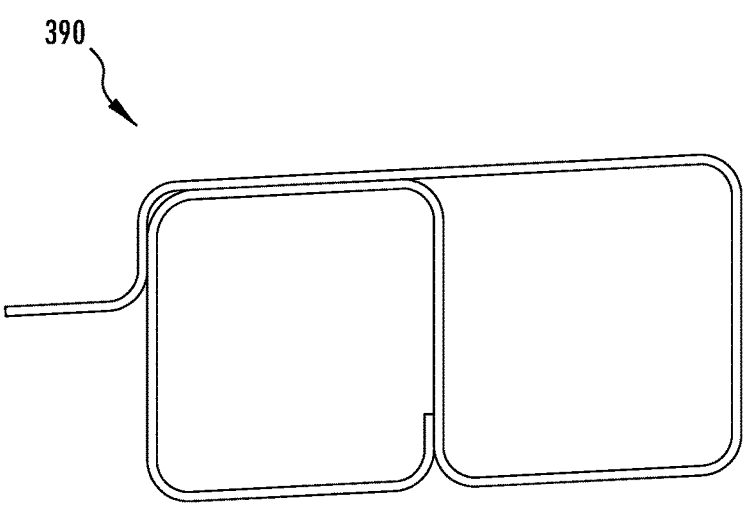
FIG. 45 is an end view of the exemplary front rail of FIG. 44.

Referring now to FIGS. 44 and 45, an eighteenth exemplary front rail 390 is shown. The front rail 390 is a structural element formed similar to the front rails 270-370 described above, with an alternative cross-sectional shape as illustrated which extends longitudinally the length of the front rail 390. A first end of the thin plate material extends outward from the closed cross-section as a single flange with the second end of the thin plate material folded inward to form a central wall in the cross-section.

Figure 46:
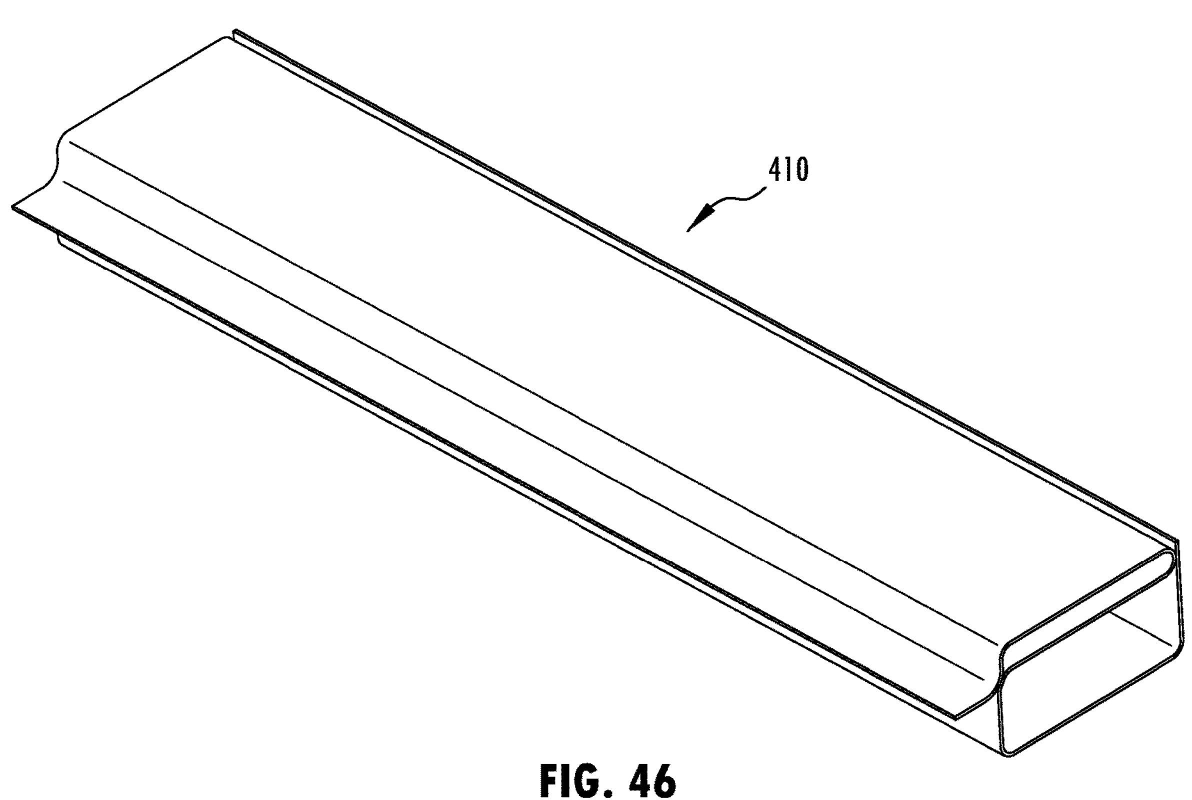
FIG. 46 is a perspective view of an eighteenth exemplary front rail according to the present disclosure.
Figure 47:
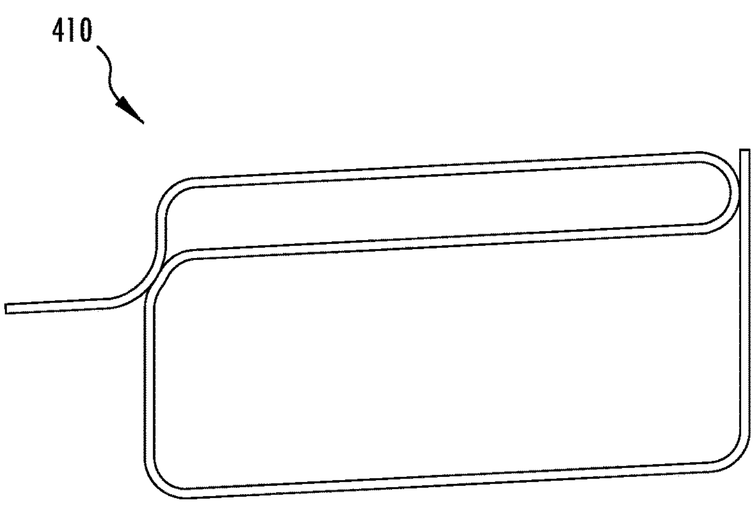
FIG. 47 is an end view of the exemplary front rail of FIG. 46.

Referring now to FIGS. 46 and 47, a nineteenth exemplary front rail 410 is shown. The front rail 410 is a structural element formed similar to the front rails 270-390 described above, with an alternative cross-sectional shape as illustrated which extends longitudinally the length of the front rail 410. A first end of the thin plate material extends outward from the closed cross-section as a single flange.

Figure 48:
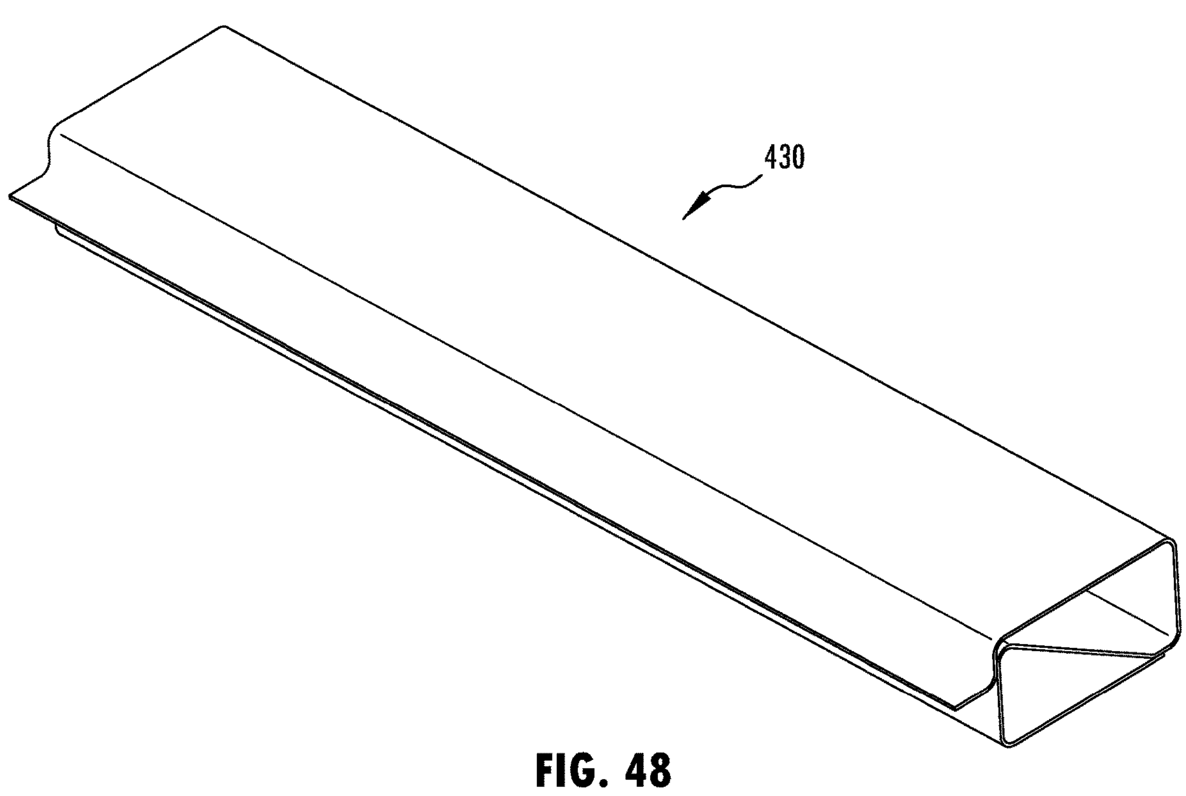
FIG. 48 is a perspective view of a nineteenth exemplary front rail according to the present disclosure.
Figure 49:
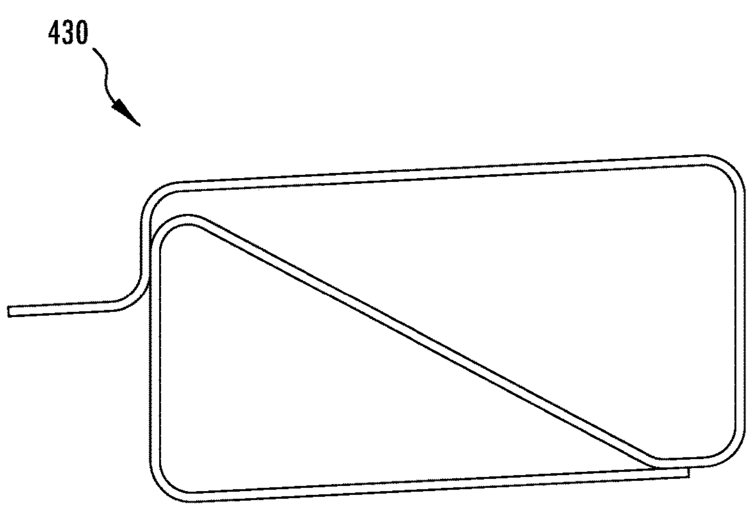
FIG. 49 is an end view of the exemplary front rail of FIG. 48.

Referring now to FIGS. 48 and 49, a twentieth exemplary front rail 430 is shown. The front rail 430 is a structural element formed similar to the front rails 270-410 described above, with an alternative cross sectional shape as illustrated which extends longitudinally the length of the front rail 430. A first end of the thin plate material extends outward from the closed cross-section as a single flange.

Figure 50:
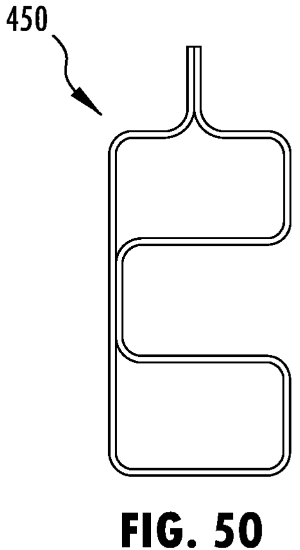

Referring to FIG. 50, a cross-sectional shape of a twenty-first exemplary front rail 450 is shown. The front rail 450 is a structural element formed similar to the front rails 270-430 described above, with an alternative cross sectional shape as illustrated which extends longitudinally the length of the front rail 450.

Figure 51:
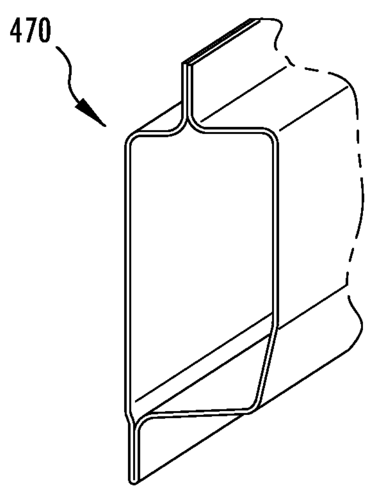

Referring to FIG. 51, a cross-sectional shape of a twenty-second exemplary front rail 470 is shown. The front rail 470 is a structural element formed similar to the front rails 270-450 described above, with an alternative cross sectional shape as illustrated which extends longitudinally the length of the front rail 470.

Figure 52:
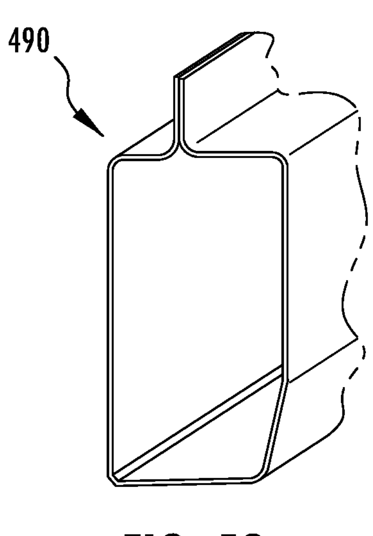

Referring to FIG. 52, a cross-sectional shape of a twenty-third exemplary front rail 490 is shown. The front rail 490 is a structural element formed similar to the front rails 270-470 described above, with an alternative cross sectional shape as illustrated which extends longitudinally the length of the front rail 490.

Figure 53:
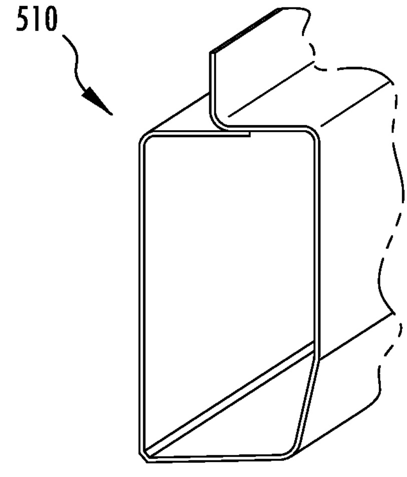

Referring to FIG. 53, a cross-sectional shape of a twenty-fourth exemplary front rail 510 is shown. The front rail 510 is a structural element formed similar to the front rails 270-490 described above, with an alternative cross sectional shape as illustrated which extends longitudinally the length of the front rail 510.

Figures 54, 55, 56, 57:
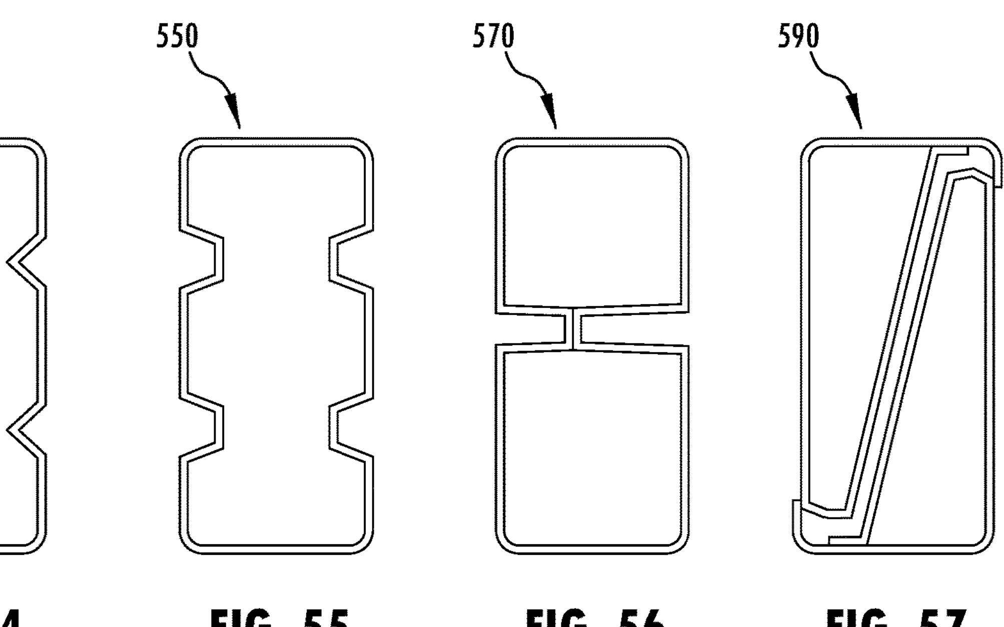

Referring to FIG. 54, a cross-sectional shape of a twenty-fifth exemplary front rail 530 is shown. The front rail 530 is a structural element formed similar to the front rails 270-510 described above, with an alternative cross sectional shape as illustrated which extends longitudinally the length of the front rail 530.

Referring to FIG. 55, a cross-sectional shape of a twenty-sixth exemplary front rail 550 is shown. The front rail 550 is a structural element formed similar to the front rails 270-530 described above, with an alternative cross sectional shape as illustrated which extends longitudinally the length of the front rail 550.

Referring to FIG. 56, a cross-sectional shape of a twenty-seventh exemplary front rail 570 is shown. The front rail 570 is a structural element formed similar to the front rails 270-550 described above, with an alternative cross sectional shape as illustrated which extends longitudinally the length of the front rail 570.

Referring to FIG. 57, a cross-sectional shape of a twenty-eighth exemplary front rail 590 is shown. The front rail 590 is a structural element formed similar to the front rails 270-570 described above, with an alternative cross sectional shape as illustrated which extends longitudinally the length of the front rail 590.

Figures 58, 59, 60:
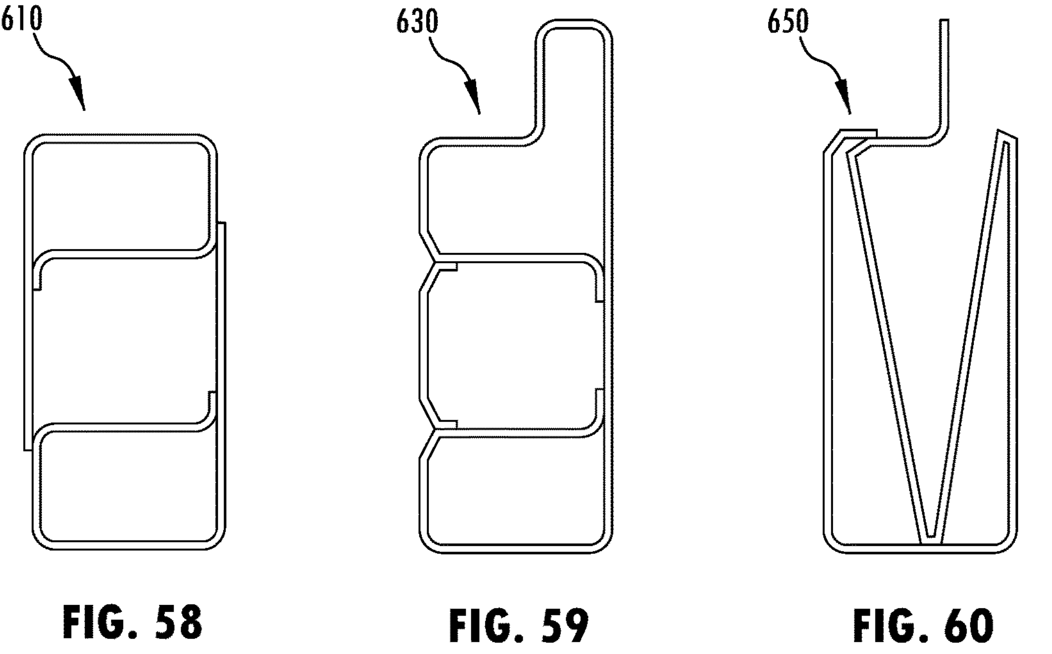

Referring to FIG. 58, a cross-sectional shape of a twenty-ninth exemplary front rail 610 is shown. The front rail 610 is a structural element formed similar to the front rails 270-590 described above, with an alternative cross sectional shape as illustrated which extends longitudinally the length of the front rail 610.

Referring to FIG. 59, a cross-sectional shape of a thirtieth exemplary front rail 630 is shown. The front rail 630 is a structural element formed similar to the front rails 270-610 described above, with an alternative cross sectional shape as illustrated which extends longitudinally the length of the front rail 630.

Referring to FIG. 60, a cross-sectional shape of a thirty-first exemplary front rail 650 is shown. The front rail 650 is a structural element formed similar to the front rails 270-630 described above, with an alternative cross sectional shape as illustrated which extends longitudinally the length of the front rail 650.

Unless specified to the contrary, it is generally understood that additional implementations of front rail may have an alternate orientation from the examples shown and described, such as where the structure is used as a rear rail, or a side support structure. The front rail may be implemented in other alternative configurations, such as a mirror image to the structure as illustrated.

It is also contemplated that the structure of the disclosed front rails may be incorporated in other types of structural beams, such as in frames and structures of automotive and marine vehicles, buildings, storage tanks, furniture, and the like. With respect to vehicle applications, the vehicle component disclosed herein may be incorporated with various applications of different structural components. The vehicle component may be designed to support and sustain different loading conditions, such as for supporting certain horizontal spans or axial loading conditions. Also, the vehicle component may be designed to undergo various impact forces, such as for the illustrated front impacts, as well as side or rear impacts. The cross-sectional geometry, material type selections, and material thickness within the cross-sectional profile of the vehicle component may be configured for such a particular use and the desired loading and performance characteristics, such as the weight, load capacity the beam, force deflection performance, and impact performance of the vehicle component.

For purposes of this disclosure, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A front rail for a vehicle frame, the front rail comprising:

a tubular beam formed from a single, high-strength metal sheet to define a closed cross-sectional shape that extends along a length of the tubular beam;

wherein the tubular beam has a front end configured to couple with a bumper assembly and a rear end opposite the front end and configured to couple to a mid-frame component;

wherein the closed cross-sectional shape of the tubular beam includes a first side wall, a second side wall, a top wall, a bottom wall, and a central wall extending between the first and second side walls to separate two hollow channels within the closed cross-sectional shape;

wherein the central wall, the first side wall, the second side wall, the top wall, and the bottom wall are together formed by the single, high-strength metal sheet; and wherein the closed cross-sectional shape is configured to undergo axial loading in a frontal vehicle impact between the front and rear ends.

2. The front rail of claim 1, wherein the two hollow channels extend longitudinally and continuously along the length of the tubular beam.

3. The front rail of claim 1, wherein the central wall is integrally connected to at least one of the first side wall or the second side wall.

4. The front rail of claim 3, wherein the first side wall of the tubular beam includes a recessed area that extends along the length of the tubular beam.

5. The front rail of claim 1, wherein the central wall extends from a first vertical location at the first side wall to a second vertical location at the second side wall, and wherein the first vertical location is lower than the second vertical location.

6. The front rail of claim 1, wherein the closed cross-sectional shape comprises a groove protruding inward of the closed cross-sectional shape and extending longitudinally in a groove direction, wherein the groove direction is substantially parallel the length of the tubular beam.

7. The front rail of claim 1, wherein the first side wall is a seamless wall formed by the single, high-strength metal sheet.

8. The front rail of claim 1, wherein a first edge and a second edge of the single, high-strength metal sheet are secured respectively at a first joint location at the first side wall and a second joint location at the second side wall.

9. A structural beam for a vehicle, the structural beam comprising:

an elongated body formed from a single metal sheet and configured to extend from a first end at a bumper assembly to a second end at a mid-frame assembly, the elongated body having a cross-sectional shape that extends a length of the elongated body;

wherein the cross-sectional shape of the elongated body includes a first side wall, a second side wall, a top wall, a bottom wall, and a central wall extending between the first and second side walls, wherein the elongated body includes two hollow channels divided by the central wall formed by the single metal sheet, and wherein the central wall, the first side wall, the second side wall, the top wall, and the bottom wall are together formed by the single metal sheet.

10. The structural beam of claim 9, wherein the second side wall forms an outer wall of the elongated body and includes a plurality of grooves protruding inwardly of the cross-sectional shape and extending longitudinally along a portion of the length of the elongated body.

11. The structural beam of claim 10, wherein the plurality of grooves are located adjacent to a bend initiator that are together configured to initiate a bending of the elongated body upon axial loading of the structural beam.

12. The structural beam of claim 9, wherein the central wall extends from a first vertical location at the first side wall to a second vertical location at the second side wall, and wherein the first vertical location is lower than the second vertical location.

13. The structural beam of claim 12, wherein a fastener is disposed at the first side wall at a central location vertically between the first and second vertical locations.

14. The structural beam of claim 9, wherein the single metal sheet comprises a high strength steel.

15. The structural beam of claim 12, further comprising:

a first recessed area disposed at the first side wall and a second recessed area disposed at the second side wall;

a first edge portion and a second edge portion of the single metal sheet; and wherein the first edge portion is positioned in the first recessed area and the second edge portion is positioned in the second recessed area, wherein the first and second side walls of the elongated body are disposed in generally parallel alignment.

16. The structural beam of claim 15, wherein a first weld joint is formed between the first edge portion and the first recessed area, and a second weld joint is formed between the second edge portion and the second recessed area.

17. The structural beam of claim 9, wherein the central wall includes a stepped shape including a first horizontal portion, a second horizontal portion, and a vertical portion attached to the first horizontal portion and the second horizontal portion.

18. The structural beam of claim 17, further comprising a plurality of fasteners on an inner wall of the elongated body, wherein at least a pair of fasteners are laterally aligned with the vertical portion of the central wall.

19. A front rail configured to be supported by a vehicle frame, the front rail comprising:

a tubular body formed by a single, high-strength metal sheet and defining a cross-sectional shape along a length of the tubular body;

wherein the cross-sectional shape includes a first side wall, a second side wall, a top wall, a bottom wall, and a central wall extending from the first side wall to the second side wall of the tubular body defining a first longitudinal hollow channel and a second longitudinal hollow channel on opposing sides of the central wall;

wherein a groove is disposed in the first side wall of the tubular body and extending longitudinally in the length of the tubular body; and wherein the tubular body is configured to undergo axial loading during a frontal vehicle impact.

20. The front rail of claim 19, wherein, under axial loading, the tubular body is configured to bend at an end of the groove.

* * * * *